United States Patent
Jia et al.

(10) Patent No.: US 11,356,328 B2
(45) Date of Patent: Jun. 7, 2022

(54) SERVICE MANAGEMENT METHOD AND APPARATUS, AND STORAGE MEDIUM

(71) Applicant: Huawei Technologies Co., Ltd., Shenzhen (CN)

(72) Inventors: Xiaoqian Jia, Shanghai (CN); Ruiyue Xu, Shanghai (CN); Kai Zhang, Shanghai (CN)

(73) Assignee: HUAWEI TECHNOLGOIES CO., LTD., Shenzhen (CN)

( * ) Notice: Subject to any disclaimer, the term of this patent is extended or adjusted under 35 U.S.C. 154(b) by 0 days.

(21) Appl. No.: 16/787,631

(22) Filed: Feb. 11, 2020

(65) Prior Publication Data

US 2020/0177462 A1 Jun. 4, 2020

Related U.S. Application Data

(63) Continuation of application No. PCT/CN2018/090612, filed on Jun. 11, 2018.

(30) Foreign Application Priority Data

Aug. 11, 2017 (CN) .......................... 201710687787.7

(51) Int. Cl.
  *H04L 12/24* (2006.01)
  *H04L 41/0893* (2022.01)
  (Continued)

(52) U.S. Cl.
  CPC ...... *H04L 41/0893* (2013.01); *H04L 41/0806* (2013.01); *H04L 41/5051* (2013.01); *H04L 41/5054* (2013.01); *H04W 48/12* (2013.01)

(58) Field of Classification Search
  CPC ............. H04L 41/0893; H04L 41/0806; H04L 41/5051; H04L 41/5054; H04L 29/06;
  (Continued)

(56) References Cited

U.S. PATENT DOCUMENTS 10,111,163 B2 * 10/2018 Vrzic ................ H04W 28/0247
10,448,320 B2 * 10/2019 Vrzic .................... H04W 72/12
(Continued)

FOREIGN PATENT DOCUMENTS

CN    106572516 A    4/2017
CN    106572517 A    4/2017
(Continued)

OTHER PUBLICATIONS

Machine Translation and Abstract of Chinese Publication No. CN106657194, May 10, 2017, 37 pages.
(Continued)

*Primary Examiner* — Michael Won
(74) *Attorney, Agent, or Firm* — Conley Rose, P.C.

(57) ABSTRACT

A service management method and apparatus, and a storage medium, where the method is used in a service management system, and where the service management system includes a service management unit and at least one first network management unit. The method includes: receiving, by the service management unit, a service management request, where the service management request carries network type indication information or service requirement information; and determining, by the service management unit, a target network type based on the network type indication information or the service requirement information, where a target network corresponding to the target network type is configured to provide a service, and the target network type includes a sliced network or a non-sliced network.

16 Claims, 6 Drawing Sheets

(51) Int. Cl.
  *H04L 41/0806* (2022.01)
  *H04L 41/5051* (2022.01)
  *H04L 41/5054* (2022.01)
  *H04W 48/12* (2009.01)

(58) Field of Classification Search
  CPC ..... H04L 29/08; H04L 43/08; H04L 43/0852; H04L 67/16; H04W 48/12; H04W 48/18
  See application file for complete search history.

(56) References Cited

U.S. PATENT DOCUMENTS

| | | | |
|---|---|---|---|
| 10,523,914 B1* | 12/2019 | Phillips | H04N 19/146 |
| 10,779,254 B2* | 9/2020 | Lee | H04L 67/141 |
| 10,812,395 B2* | 10/2020 | Farmanbar | H04L 41/0896 |
| 10,917,317 B2* | 2/2021 | Stammers | H04L 41/5048 |
| 11,146,645 B2* | 10/2021 | Kodaypak | H04L 41/0803 |
| 2015/0365742 A1 | 12/2015 | Yang et al. | |
| 2016/0353367 A1 | 12/2016 | Vrzic et al. | |
| 2017/0070892 A1* | 3/2017 | Song | H04W 48/20 |
| 2017/0086118 A1 | 3/2017 | Vrzic | |
| 2017/0135099 A1* | 5/2017 | Song | H04W 16/02 |
| 2017/0141973 A1 | 5/2017 | Vrzic | |
| 2017/0142591 A1 | 5/2017 | Vrzic | |
| 2017/0164212 A1* | 6/2017 | Opsenica | H04L 41/0246 |
| 2017/0164349 A1 | 6/2017 | Zhu et al. | |
| 2017/0289791 A1* | 10/2017 | Yoo | H04W 68/005 |
| 2017/0359272 A1* | 12/2017 | Srinivasan | H04L 47/808 |
| 2018/0123961 A1* | 5/2018 | Farman | H04L 43/0888 |
| 2018/0192445 A1 | 7/2018 | Jiang | |
| 2018/0242198 A1* | 8/2018 | Choi | H04W 28/18 |
| 2018/0310238 A1* | 10/2018 | Opsenica | H04W 12/06 |
| 2018/0316543 A1* | 11/2018 | Hwang | H04W 12/009 |
| 2018/0316627 A1* | 11/2018 | Cui | H04L 47/805 |
| 2018/0352501 A1* | 12/2018 | Zhang | H04W 48/14 |
| 2018/0359337 A1* | 12/2018 | Kodaypak | H04W 72/048 |
| 2019/0020996 A1* | 1/2019 | Zhang | H04W 8/12 |
| 2019/0098545 A1* | 3/2019 | Zhang | H04W 36/22 |
| 2019/0124508 A1* | 4/2019 | Watfa | H04W 4/18 |
| 2019/0150017 A1* | 5/2019 | Yao | H04W 24/10 370/252 |
| 2019/0174392 A1* | 6/2019 | Chun | H04W 48/02 |
| 2019/0230584 A1 | 7/2019 | Lou et al. | |
| 2019/0238413 A1* | 8/2019 | Holmstrom | H04L 41/0893 |
| 2019/0373520 A1* | 12/2019 | Sillanpaa | H04W 36/14 |
| 2020/0044943 A1* | 2/2020 | Bor-Yaliniz | H04L 41/5067 |
| 2020/0186411 A1* | 6/2020 | Ravichandran | H04L 41/0668 |
| 2020/0205176 A1* | 6/2020 | Yu | H04W 72/042 |
| 2021/0037375 A1* | 2/2021 | Cakulev | H04L 12/1407 |
| 2021/0153287 A1* | 5/2021 | Salkintzis | H04W 84/00 |

FOREIGN PATENT DOCUMENTS

| | | |
|---|---|---|
| CN | 106657194 A | 5/2017 |
| CN | 106851589 A | 6/2017 |
| RU | 2633527 C1 | 10/2017 |

OTHER PUBLICATIONS

"3rd Generation Partnership Project; Technical Specification Group Services and System Aspects; System Architecture for the 5G System; Stage 2 (Release 15)," 3GPP TS 23.501 V1.2.0, Jul. 2017, 166 pages.

"3rd Generation Partnership Project; Technical Specification Group Services and System Aspects; Telecommunication management; Management of network slicing in mobile networks; Concepts, use cases and requirements (Release 15)," 3GPP TS 28.530 V0.0.0, Jun. 2017, 6 pages.

"3rd Generation Partnership Project; Technical Specification Group Services and System Aspects; Telecommunication Management; Provisioning of network slicing for 5G networks and services (Release 15)," 3GPP TS 28.531 V0.0.0, Aug. 2017, 6 pages.

"3rd Generation Partnership Project; Technical Specification Group Services and System Aspects; Telecommunication management; Study on management and orchestration of network slicing for next generation network (Release 15)," 3GPP TR 28.801 V1.2.0, May 2017, 79 pages.

Foreign Communication From A Counterpart Application, PCT Application No. PCT/CN2018/090612, English Translation of International Search Report dated Aug. 29, 2018, 3 pages.

Foreign Communication From A Counterpart Application, PCT Application No. PCT/CN2018/090612, English Translation of Written Opinion dated Aug. 29, 2018, 3 pages.

Flying, X., "What is APN and what functions does it have?," Baidu, Mar. 2, 2011, with a machine translation, 4 pages.

Hongyu, X., et al., "Edge computing and network slicing technology in 5G," Telecommunications Science, 2017,with an English abstract, 10 pages.

3GPP TR 28.801 V0.2.0 "3rd Generation Partnership Project;Technical Specification Group Services and System Aspects;Telecommunication management;Study on management and orchestration of network slicing for next generationnetwork (Release 14)," Sep. 2016, 36 pages.

3GPP TR 28.801 V2.0.0, "3rd Generation Partnership Project; Technical Specification Group Services and System Aspects; Telecommunication management; Study on management and orchestration of network slicing for next generation network (Release 15)," Sep. 2017, 110 pages.

* cited by examiner

SERVICE MANAGEMENT METHOD AND APPARATUS, AND STORAGE MEDIUM

CROSS-REFERENCE TO RELATED APPLICATIONS

This application is a continuation of International Patent Application No. PCT/CN2018/090612, filed on Jun. 11, 2018, which claims priority to Chinese Patent Application No. 201710687787.7, filed on Aug. 11, 2017. The disclosures of the aforementioned applications are hereby incorporated by reference in their entireties.

TECHNICAL FIELD

This application relates to the field of communications technologies, and in particular, to a service management method and apparatus, and a storage medium.

BACKGROUND

To meet service requirements of different industries, different services, and different users for a network, an operator usually divides the network into different network slices in advance to satisfy the different service requirements, to provide differentiated communication services. When a service is deployed, whether a sliced network is used for the service is determined in advance. A slice management system is used for deployment of a service for which a sliced network is used, a non-slice management system is used for deployment of a service for which a non-sliced network is used, and the slice management system and the non-slice management system are independent of each other.

Some of future services may be provided by sliced networks, and some are provided by non-sliced networks. Therefore, to adapt to coexistence of diversified services, an operator usually provides services of the diversified services using a hybrid network in which sliced networks and non-sliced networks coexist. When a new service is launched, it needs to be manually determined in advance whether the service is implemented using a sliced network. Consequently, a requirement for fast launch of the service cannot be met. In addition, in an existing sliced network architecture, one service management unit may send slice request messages to a plurality of slice management units. However, the service management unit cannot accurately select a slice management unit suitable to carry a new service, and entire service deployment efficiency is relatively low.

SUMMARY

Embodiments of this application provide a service management method and apparatus, and a storage medium, to resolve a problem of relatively low deployment efficiency of service deployment based on a sliced network in an existing mechanism.

One aspect of the embodiments of this application provides a service management method. The method is used in a service management system, the service management system includes a service management unit and at least one first network management unit, and the method includes the following steps.

The service management unit receives a service management request, where the service management request carries network type indication information or service requirement information. The network type indication information may be used to indicate a network type of a target network that provides a service. For example, the network type indication information may indicate whether the network type of the target network is a sliced network or a non-sliced network.

The service requirement information may include at least one of the following parameters: a service level, a service type, a tenant level, an isolation requirement, a throughput, coverage, a quantity of users, a latency requirement, quality of service, a service security level, a tenant identifier, or a service identifier. The service identifier may indicate the service type of the service, and the tenant identifier corresponds to the tenant level.

After receiving the service management request, the service management unit may determine a target network type based on the network type indication information or the service requirement information, where the target network type includes a sliced network or a non-sliced network. For example, when the service management request includes the network type indication information, the service management unit may determine, based on the network type indication information, whether the target network type is a sliced network or a non-sliced network. When the service management request includes the service requirement information, the service management unit may determine, based on the service requirement information, whether the target network type is a sliced network or a non-sliced network.

In an existing mechanism, two separate management systems are needed to respectively manage a sliced network and a non-sliced network, and whether a sliced network needs to be used for a service cannot be quickly determined. However, in the solution provided in this application, after receiving the service management request that carries the network type indication information and the service requirement information, the service management unit may determine, based on the network type indication information, whether the type of the network that serves the service is a sliced network. In this way, a manual determining workload is reduced, such that subsequently, the service management unit can perform a corresponding procedure in a targeted and accurate manner based on the determined network type, service access management can be optimized, and service deployment efficiency can be improved. In addition, the service management unit may perform service access management on both a sliced network and a non-sliced network, to implement management centralization.

In some possible designs, after the service management unit determines, based on the network type indication information or the service requirement information, that the target network type is a sliced network, the service management unit may further send a network request to a target network management unit in the at least one first network management unit.

The network request carries network requirement information, and the network requirement information may be obtained based on the service requirement information. The network request is used to instruct the target network management unit to allocate, to the service based on the network requirement information, a network slice that meets the network requirement information.

Similarly, after the service management unit determines that the target network type is a non-sliced network, the service management unit may further send a network request to the target network management unit in the at least one first network management unit. The network request also carries the network requirement information, to instruct the target network management unit to allocate, to the service, a target network that meets the network requirement information.

The following describes two manners of determining the target network type.

1. The service management unit determines the target network type based on the network type indication information.

For example, if the target network type indicated in the network type indication information is a network type that needs to be implemented using a sliced network, the service management unit determines that the target network type is a sliced network.

It can be learned that the service management unit can accurately and quickly determine, directly based on the network type indication information, whether a sliced network needs to be used for a service that is to perform access, to provide a corresponding target network for the service in a targeted manner in a subsequent procedure, thereby improving service management efficiency.

2. The service management unit determines the target network type based on the service requirement information.

The service management unit determines the target network type in the following two implementations.

(a) The service management unit determines the target network type based on the service requirement information.

For example, the service management unit may determine the target network type based on the service requirement information and a preset policy. The preset policy includes an association relationship between a network type and service requirement information. In other words, the service management unit may determine the target network type based on the association relationship between a network type and service requirement information and the service requirement information.

In some implementations, the association relationship between a network type and service requirement information includes at least one of the following: an association relationship between a service level and a network type; an association relationship between a service type and a network type; an association relationship between a tenant level and a network type; an association relationship between an isolation requirement and a network type; an association relationship between a throughput and a network type; an association relationship between coverage and a network type; an association relationship between a quantity of users and a network type; an association relationship between a latency requirement and a network type; an association relationship between quality of service and a network type; or an association relationship between a service security level and a network type.

For example, the service management unit may determine, based on the foregoing association relationships between network types and service requirement information and the service requirement information in at least one of the following implementations, that the target network type is a sliced network.

If the service level in the service requirement information is a service level that needs to be implemented using a sliced network, the service management unit determines that the target network type is a sliced network. For example, it may be predefined that a service whose service level is higher than a preset service level needs to be implemented using a sliced network.

If the service type in the service requirement information is a service type that needs to be implemented using a sliced network, the service management unit determines that the target network type is a sliced network. For example, it may be predefined that a sliced network needs to be used for a particular service such as an enhanced mobile broadband (eMBB) service, a machine type communication (MTC) service, an enhanced MTC (eMTC) service, a massive machine type communication (mMTC) service, an Internet of things (IoT) service, or an ultra-reliable low-latency communication (URLLC) service. When the service type included in the service requirement information is one of these service types, it indicates that a sliced network needs to be used for the service.

If the tenant level in the service requirement information is a tenant level that needs to be implemented using a sliced network, the service management unit determines that the target network type is a sliced network. For example, it may be predefined that a sliced network needs to be used for a service whose tenant level is higher than a preset tenant level.

The isolation requirement may be represented by a service isolation level. If a service isolation level in the service requirement information is a service isolation level that needs to be implemented using a sliced network, the service management unit determines that the target network type is a sliced network. For example, it may be predefined that a sliced network needs to be used for a service whose service isolation level is higher than a preset service isolation level.

If the latency requirement in the service requirement information is lower than a preset latency, the service management unit determines that the target network type is a sliced network. For example, it may be predefined that a sliced network needs to be used for a service whose latency is lower than the preset latency.

If the quality of service in the service requirement information is quality of service that needs to be implemented using a sliced network, the service management unit determines that the target network type is a sliced network. For example, it may be predefined that a sliced network needs to be used for a service whose quality of service is higher than preset quality of service.

It can be learned that the service management unit in this application can accurately and quickly determine, directly based on one or more parameter values in the service requirement information, whether a sliced network needs to be used for the service, to correspondingly serve the service in a targeted manner in a subsequent procedure, thereby improving service management efficiency.

(b) The service management unit determines the target network type based on the network requirement information.

For example, after obtaining the service requirement information, the service management unit may first convert the service requirement information into the network requirement information, and then determine the target network type based on the network requirement information.

In some implementations, the service management unit may determine the target network type based on the network requirement information and a preset policy. The preset policy may further include an association relationship between a network type and network requirement information. In other words, the service management unit may determine the target network type based on the association relationship between a network type and network requirement information and the network requirement information. The network requirement information may include at least one of the following: a latency requirement of the target network, a quantity of users that need to access the target network, a security requirement of the target network, an isolation requirement of the target network, a bandwidth requirement of the target network, a throughput of the target network, coverage of the target network, or quality of service of the target network.

In some implementations, the association relationship between a network type and network requirement information includes at least one of the following: an association relationship between a latency requirement of a network and a network type; an association relationship between a quantity of users that need to access a network and a network type; an association relationship between a security requirement of a network and a network type; an association relationship between an isolation requirement of a network and a network type; an association relationship between a bandwidth requirement of a network and a network type; an association relationship between a throughput of a network and a network type; an association relationship between coverage of a network and a network type; or an association relationship between quality of service of a network and a network type.

For example, the service management unit may determine, based on the foregoing association relationships between network types and network requirement information in at least one of the following implementations, that the target network type is a sliced network.

If the latency requirement of the target network is lower than a preset latency, the service management unit determines that the target network type is a sliced network. For example, it may be predefined that a sliced network needs to be used for a service whose latency is lower than the preset latency, and it may be determined that the target network that a service is to access is a sliced network.

If the quantity of users that need to access the target network is a quantity of users that need to be implemented using a sliced network, the service management unit determines that the target network type is a sliced network. For example, it may be predefined that a sliced network needs to be used for a service whose quantity of users is higher than a preset quantity of users, and then, it may be determined that the target network that a service is to access is a sliced network.

The security requirement of the network may be represented by a network security level. If a network security level of the target network is a network security level that needs to be implemented using a sliced network, the service management unit determines that the target network type is a sliced network. For example, it may be predefined that a sliced network needs to be used for a service whose network security level is higher than a preset network security level, and then, it may be determined that the target network that a service is to access is a sliced network.

The isolation requirement of the network may be represented by a network isolation level. If a network isolation level of the target network is a network isolation level that needs to be implemented using a sliced network, the service management unit determines that the target network type is a sliced network. For example, it may be predefined that a sliced network needs to be used for a service whose network isolation level is higher than a preset network isolation level, and then, it may be determined that the target network that a service is to access is a sliced network.

If the bandwidth requirement of the target network is bandwidth that needs to be implemented using a sliced network, the service management unit determines that the target network type is a sliced network. For example, it may be predefined that a sliced network needs to be used for a service whose bandwidth is higher than preset bandwidth, and then, it may be determined that the target network that a service is to access is a sliced network.

If the quality of service of the target network is quality of service that needs to be implemented using a sliced network, the service management unit determines that the target network type is a sliced network. For example, it may be predefined that a sliced network needs to be used for a service whose quality of service is higher than preset quality of service, and then, it may be determined that the target network that a service is to access is a sliced network.

It can be learned that the service management unit in this application can accurately and quickly determine, directly based on one or more parameter values in the network requirement information and the foregoing association relationships between network types and network requirement information, whether a sliced network needs to be used for the service, to provide a corresponding network slice for the service in a targeted manner in a subsequent procedure, thereby improving service management efficiency.

In some possible designs, after the service management unit determines, based on the network type indication information and the service requirement information, that the type of the network that serves the service is a sliced network, and before the service management unit sends the network request to the target network management unit, the service management unit may further determine the target network management unit in the at least one first network management unit. The target network management unit has a capability of carrying the service.

Optionally, the service management unit may determine the target network management unit based on the network requirement information and network capability information of the network management unit.

The service management unit may obtain the network capability information periodically or in an event-triggered manner.

That the target network management unit is selected in this manner can improve processing efficiency of sliced network allocation. The service management unit may further first determine a first network management unit that is currently capable of providing a network slicing service for the service, to reduce message sending and quickly select a proper target network management unit.

In some possible designs, the method further includes the following.

The service management unit sends a network capability request to the at least one first network management unit, where the network capability request is used to obtain current network capability information of the first network management unit. Optionally, the network capability request instructs the network management unit to feed back a part or all of the current network capability information of the network management unit, and the network capability information includes at least one of the following: network slice instance capability information, network slice instance information, or network slice template information. Because the network slice instance capability information, the network slice instance information, and the network slice template information can truly and accurately reflect a current real service capability of the first network management unit, the network slice instance capability information, the network slice instance information, and the network slice template information are provided for the service management unit, such that the service management unit can more accurately select the first network management unit suitable to carry the service.

The service management unit receives a network capability request response sent by the at least one first network management unit, where each network capability request response carries a first network management unit identifier and network capability information corresponding to the first network management unit identifier.

Then, the service management unit updates locally stored network capability information based on the at least one received network capability request response.

For example, the service management unit may determine, in the at least one first network management unit based on currently stored network capability information of each of the at least one first network management unit, a first network management unit that meets the network requirement information. The first network management unit that meets the network requirement information is the target network management unit.

It can be learned that the first network management unit that is currently capable of providing a network slicing service for the service is selected based on the network capability information, such that accuracy of selecting the target network management unit can be improved, processing efficiency of sliced network allocation can be improved, message sending can be reduced, and a proper target network management unit can be quickly selected.

Another aspect of the embodiments of this application provides a service management method. The method is used in a service management system, and the service management system includes a management unit and at least one first network management unit. The management unit includes a service management unit, and may further include a second network management unit. The method may include the following.

A first network management unit receives a network request sent by the management unit (including the service management unit or the second network management unit), where the network request carries network requirement information obtained based on service requirement information, and the service requirement information is from a service management request. The service requirement information includes at least one of the following information: a service level, a service type, a tenant level, an isolation requirement, a throughput, coverage, a quantity of users, a latency requirement, or quality of service.

After receiving the network request, the first network management unit allocates or creates, to or for the service based on the network requirement information, a network slice that meets the network requirement information.

Then, the first network management unit sends a network request response to the management unit (including the service management unit or the second network management unit), where the network request response is used to indicate that the first network management unit has a capability of carrying the service. In this way, the management unit (including the service management unit or the second network management unit) can determine, based on the network request response, a network management unit having a capability of carrying the service.

In some possible designs, after receiving, by a first network management unit, a network request sent by the management unit (including the service management unit or the second network management unit), and before allocating or creating, by the first network management unit to or for the service based on the network requirement information, a network slice that meets the network requirement information, the method further includes the following.

The first network management unit determines, based on the network requirement information and current network capability information of the first network management unit, whether the first network management unit has a capability of carrying the service.

If it is determined that the first network management unit has the capability of carrying the service, the first network management unit sends the network request response to the management unit (including the service management unit or the second network management unit). According to this determining mechanism and feedback mechanism, accurate information can be provided for the management unit (including the service management unit or the second network management unit), such that the management unit (including the service management unit or the second network management unit) selects a proper first network management unit in a targeted manner to provide a network slice for the service.

In some possible designs, the first network management unit receives a network capability request sent by the service management unit, where the network capability request is used to obtain the current network capability information of the first network management unit.

The first network management unit sends a network capability request response to the management unit (including the service management unit or the second network management unit) based on the network capability request, where the network capability request response carries a first network management unit identifier and the current network capability information of the first network management unit. Network capability information of the management unit (including the service management unit or the second network management unit) is fed back in real time to the management unit, such that when a service that needs to be implemented using a sliced network needs to perform access, the management unit (including the service management unit or the second network management unit) can select a proper first network management unit in an accurate and targeted manner.

In some possible designs, the network capability information includes at least one of the following: network slice instance capability information, network slice instance information, and network slice template information. Because the network slice instance capability information, the network slice instance information, and the network slice template information can truly and accurately reflect a current real service capability of the first network management unit, the network slice instance capability information, the network slice instance information, and the network slice template information are provided for the management unit (including the service management unit or the second network management unit), and the service management unit can more accurately select the first network management unit suitable to carry the service.

Another aspect of the embodiments of this application provides a service management method. The method includes the following.

A second network management unit receives a network management request sent by a service management unit, where the network management request carries network type indication information or network requirement information.

The network type indication information may be used to indicate a target network type.

Optionally, the network requirement information includes at least one of the following: a latency requirement of a target network, a quantity of users that need to access the target network, a security requirement of the target network, an isolation requirement of the target network, a bandwidth requirement of the target network, a throughput of the target network, coverage of the target network, or quality of service of the target network.

The network requirement information is obtained by the service management unit based on service requirement information carried in the service management request.

After receiving the network management request, the second network management unit may determine a target network type based on the network type indication information or the network requirement information, where the target network type includes a sliced network or a non-sliced network. For example, when the network management request carries the network type indication information, the second network management unit may determine, based on the network type indication information, whether the target network type is a sliced network or a non-sliced network. When the network management request carries the network requirement information, the second network management unit may determine, based on the network requirement information, whether the target network type is a sliced network or a non-sliced network.

In an existing mechanism, two separate management systems are needed to respectively manage a sliced network and a non-sliced network, and whether a sliced network needs to be used for a service cannot be quickly determined. However, in the solution provided in this application, after receiving the network management request that carries the network type indication information or the network requirement information, the second network management unit may determine, based on the network type indication information or the network requirement information, whether the target network type is a sliced network. In this way, a manual determining workload is reduced, such that service access management can be optimized, and service deployment efficiency can be improved.

The following describes two manners of determining the target network type based on the network type indication information or the network requirement information.

1. The second network management unit determines the target network type based on the network type indication information.

For example, if the network type indicated in the network type indication information is a sliced network, the second network management unit determines that the target network type is a sliced network.

If the network type indicated in the network type indication information is a non-sliced network, the second network management unit determines that the target network type is a non-sliced network.

It can be learned that the second network management unit can accurately and quickly determine, directly based on the network type indication information, whether a sliced network needs to be used for a service, to correspondingly serve the service in a targeted manner in a subsequent procedure, thereby improving service management efficiency.

2. The second network management unit determines the target network type based on the network requirement information.

In some implementations, the second network management unit may determine the target network type based on the network requirement information and a preset policy. The preset policy includes an association relationship between a network type and network requirement information. In other words, the second network management unit may determine the target network type based on the association relationship between a network type and network requirement information and the network requirement information.

In some implementations, the association relationship between a network type and network requirement information may include at least one of the following association relationships: an association relationship between a latency requirement of a network and a network type; an association relationship between a quantity of users that need to access a network and a network type; an association relationship between a security requirement of a network and a network type; an association relationship between an isolation requirement of a network and a network type; an association relationship between a bandwidth requirement of a network and a network type; an association relationship between a throughput of a network and a network type; an association relationship between coverage of a network and a network type; or an association relationship between quality of service of a network and a network type.

For example, the second network management unit may determine, based on the association relationship between a network type and network requirement information and the network requirement information in at least one of the following implementations, that the target network type is a sliced network.

If the latency requirement of the target network is lower than a preset latency, the service management unit determines that the target network type is a sliced network.

If the quantity of users that need to access the target network is a quantity of users that need to be implemented using a sliced network, the service management unit determines that the target network type is a sliced network. For example, it may be predefined that a sliced network needs to be used for a service whose quantity of users is higher than a preset quantity of users.

The security requirement of the network may be represented by a network security level. If a network security level of the target network is a network security level that needs to be implemented using a sliced network, the service management unit determines that the target network type is a sliced network. For example, it may be predefined that a sliced network needs to be used for a service whose network security level is higher than a preset network security level.

The isolation requirement of the network may be represented by a network isolation level. If a network isolation level of the target network is a network isolation level that needs to be implemented using a sliced network, the service management unit determines that the target network type is a sliced network. For example, it may be predefined that a sliced network needs to be used for a service whose network isolation level is higher than a preset network isolation level.

If the bandwidth requirement of the target network is bandwidth that needs to be implemented using a sliced network, the service management unit determines that the target network type is a sliced network. For example, it may be predefined that a sliced network needs to be used for a service whose bandwidth is higher than preset bandwidth.

If the quality of service of the target network is quality of service that needs to be implemented using a sliced network, the service management unit determines that the target network type is a sliced network. For example, it may be predefined that a sliced network needs to be used for a service whose quality of service is higher than preset quality of service.

It can be learned that the second network management unit in this application can accurately and quickly determine, directly based on one or more parameter values in the network requirement information and the association relationship between a network type and network requirement information, whether a sliced network needs to be used for the service, to correspondingly serve the service in a targeted manner in a subsequent procedure, thereby improving service management efficiency.

In some possible designs, the second network management unit may further send a network request to a target network management unit in at least one first network management unit after the second network management unit determines, based on the network type indication information or the network requirement information, that the target network type is a sliced network, where the network request carries the network requirement information.

The network request is used to instruct the target network management unit to allocate or create, to or for the service based on the network requirement information, a network slice that meets the network requirement information.

In some possible designs, before sending, by the second network management unit, a network request to a target network management unit in at least one first network management unit after the second network management unit determines, based on the network type indication information or the network requirement information, that the target network type is a sliced network, the method further includes the following.

The second network management unit determines the target network management unit in the at least one first network management unit. The target network management unit has a capability of carrying the service.

Optionally, the second network management unit may further determine the target network management unit based on locally stored network capability information of the first network management unit. The second network management unit may obtain the network capability information periodically or in an event-triggered manner. This is not specifically limited in this embodiment of this application.

That the target network management unit is selected in this manner can improve processing efficiency of sliced network allocation. The second network management unit may further first determine a first network management unit that is currently capable of providing a network slicing service for the service, to reduce message sending and quickly select a proper target network management unit.

In some possible designs, before the second network management unit determines the target network management unit in the at least one first network management unit, the second network management unit may further send a network capability request to the at least one first network management unit, where the network capability request is used to obtain current network capability information of the at least one first network management unit. It should be noted that a time sequence of sending the network capability request is not limited in this application.

Optionally, the network capability request instructs the first network management unit to feed back a part or all of current network capability information of the first network management unit, and the network capability information includes at least one of the following: network slice instance capability information, network slice instance information, or network slice template information.

Because the network slice instance capability information, the network slice instance information, and the network slice template information can truly and accurately reflect a current real service capability of each first network management unit, the network slice instance capability information, the network slice instance information, and the network slice template information are provided for the second network management unit, such that the second network management unit can more accurately select a network management unit suitable to carry the service.

Correspondingly, the second network management unit receives a network capability request response sent by the at least one first network management unit, where each network capability request response carries a first network management unit identifier and network capability information corresponding to the first network management unit identifier.

Then, the second network management unit may update locally stored network capability information of each first network management unit based on the at least one received network capability request response.

For example, the second network management unit determines, in the at least one first network management unit based on network capability information of each of the at least one first network management unit, a target network management unit that meets a service requirement of the service.

It can be learned that the target network management unit that is currently capable of providing a network slicing service for the service is selected based on the network capability information, such that processing efficiency of sliced network allocation can be improved, message sending can be reduced, and a proper target network management unit can be quickly selected.

Another aspect of the embodiments of this application provides a service management apparatus, having a corresponding function of implementing the service management method performed by the service management unit according to the foregoing aspects. The function may be implemented using hardware, or may be implemented by executing corresponding software by hardware. The hardware or software includes one or more modules corresponding to the function. The module may be software and/or hardware. In a possible design, the apparatus is used in a service management system, the service management system includes the apparatus and at least one first network management unit, and the apparatus includes: a transceiver module configured to receive a service management request, where the service management request carries network type indication information or service requirement information; and a processing module configured to determine a target network type based on the network type indication information or the service requirement information, where a target network corresponding to the target network type is configured to provide a service, and the target network type includes a sliced network or a non-sliced network. The network type indication information is used to indicate the target network type.

In some possible designs, the service requirement information includes at least one of the following information: a service level, a service type, a tenant level, an isolation requirement, a throughput, coverage, a quantity of users, a latency requirement, or quality of service.

In some possible designs, the processing module is configured to determine the target network type based on the service requirement information and a preset policy, where the preset policy includes an association relationship between a network type and service requirement information.

In some implementations, the association relationship between a network type and service requirement information includes at least one of the following: an association relationship between a service level and a network type; an association relationship between a service type and a network type; an association relationship between a tenant level and a network type; an association relationship between an isolation requirement and a network type; an association relationship between a throughput and a network type; an association relationship between coverage and a network type; an association relationship between a quantity of users and a network type; an association relationship between a latency requirement and a network type; or an association relationship between quality of service and a network type.

In some possible designs, the processing module is configured to: convert the service requirement information into network requirement information; and determine the target network type based on the network requirement information.

In some possible designs, the processing module determines the target network type based on the network requirement information and a preset policy, where the preset policy includes an association relationship between a network type and network requirement information.

The network requirement information may include at least one of the following: a latency requirement of the target network, a quantity of users that need to access the target network, a security requirement of the target network, an isolation requirement of the target network, a bandwidth requirement of the target network, a throughput of the target network, coverage of the target network, or quality of service of the target network.

Correspondingly, in some possible designs, the association relationship between a network type and network requirement information includes at least one of the following: an association relationship between a latency requirement of a network and a network type; an association relationship between a quantity of users that need to access a network and a network type; an association relationship between a security requirement of a network and a network type; an association relationship between an isolation requirement of a network and a network type; an association relationship between a bandwidth requirement of a network and a network type; an association relationship between a throughput of a network and a network type; an association relationship between coverage of a network and a network type; or an association relationship between quality of service of a network and a network type.

In some possible designs, after determining the target network type based on the network type indication information or the service requirement information, the processing module is further configured to: send, using the transceiver module, a network request to a target network management unit in at least one first network management unit after determining, based on the network type indication information or the service requirement information, that the target network type is a sliced network.

The network request carries the network requirement information. The network request is used to instruct the target network management unit to allocate or create, to or for the service based on the network requirement information, a network slice that meets the network requirement information.

In some possible designs, before sending, using the transceiver module, the network request to the target network management unit in the at least one first network management unit after determining, based on the network type indication information or the service requirement information, that the target network type is a sliced network, the processing module is further configured to determine the target network management unit in the at least one first network management unit, where the target network management unit has a capability of carrying the service. In some implementations, the processing module may determine the target network management unit based on currently obtained network requirement information and network capability information of each first network management unit.

In some possible designs, the processing module is further configured to: send, using the transceiver module, a network capability request to the at least one first network management unit, where the network capability request is used to obtain current network capability information of the at least one network management unit; receive, using the transceiver module, a network capability request response sent by the at least one first network management unit, where each network capability request response carries a first network management unit identifier and network capability information corresponding to the first network management unit identifier; and update locally stored network capability information of each first network management unit based on the at least one received network capability request response.

Another aspect of the embodiments of this application provides a service management apparatus, having a corresponding function of implementing the service management method performed by the network management unit according to the foregoing aspects. The function may be implemented using hardware, or may be implemented by executing corresponding software by hardware. The hardware or software includes one or more modules corresponding to the function. The module may be software and/or hardware. In a possible design, the apparatus is used in a service management system, the service management system includes at least one apparatus and a second network management unit, and the apparatus includes a transceiver module configured to receive a network request sent by the service management unit or the second network management unit, where the network request carries network requirement information obtained based on service requirement information, and the service requirement information is from a service management request. The service requirement information includes at least one of the following information: a service level, a service type, a tenant level, an isolation requirement, a throughput, coverage, a quantity of users, a latency requirement, or quality of service. The apparatus further includes a processing module configured to: allocate or create, to or for the service based on the network requirement information, a network slice that meets the network requirement information; and send, using the transceiver module, a network request response to the service management unit or the second network management unit, where the network request response is used to indicate that the first network management unit has a capability of carrying the service.

In some possible designs, after the transceiver module receives the network request sent by the service management unit or the second network management unit, and before the processing module allocates or creates, to or for the service based on the network requirement information, the network slice that meets the network requirement information, the processing module is further configured to: determine, based on the network requirement information and current network capability information of the first network management unit, whether to have a capability of carrying the service; and send, using the transceiver module, the network request response to the service management unit or the second network management unit if it is determined to have the capability of carrying the service.

In some possible designs, the processing module is further configured to: receive, using the transceiver module, a network capability request sent by the service management unit or the second network management unit, where the network capability request is used to obtain current network capability information of the first network management unit; and send a network capability request response to the service management unit or the second network management unit based on the network capability request, where the network capability request response carries a first network management unit identifier and the current network capability information of the first network management unit.

In some possible designs, the network capability information includes at least one of the following: network slice instance capability information, network slice instance information, or network slice template information.

Another aspect of the embodiments of this application provides a service management apparatus, having a corresponding function of implementing the service management method performed by the network management unit according to the foregoing aspects. The function may be implemented using hardware, or may be implemented by executing corresponding software by hardware. The hardware or software includes one or more modules corresponding to the function. The module may be software and/or hardware. In a possible design, the apparatus is used in a service management system, the service management system includes a service management unit, the apparatus, and at least one first network management unit, and the apparatus includes: a transceiver module configured to receive a network management request sent by a service management unit, where the network management request carries network type indication information or network requirement information; and a processing module configured to determine a target network type based on the network type indication information or the network requirement information, where the target network type includes a sliced network or a non-sliced network. The network type indication information is used to indicate the network type.

In some possible designs, the processing module is configured to determine the target network type based on the network requirement information and a preset policy, where the preset policy includes an association relationship between a network type and network requirement information.

In some possible designs, the network requirement information includes at least one of the following: a latency requirement of a target network, a quantity of users that need to access the target network, a security requirement of the target network, an isolation requirement of the target network, a bandwidth requirement of the target network, a throughput of the target network, coverage of the target network, and quality of service of the target network. In some possible designs, the association relationship between a network type and network requirement information includes at least one of the following association relationships: an association relationship between a latency requirement of a network and a network type; an association relationship between a quantity of users that need to access a network and a network type; an association relationship between a security requirement of a network and a network type; an association relationship between an isolation requirement of a network and a network type; an association relationship between a bandwidth requirement of a network and a network type; an association relationship between a throughput of a network and a network type; an association relationship between coverage of a network and a network type; or an association relationship between quality of service of a network and a network type.

In some possible designs, after determining the target network type based on the network type indication information or the network requirement information, the processing module is further configured to send, using the transceiver module, a network request to a target network management unit in the at least one first network management unit after determining, based on the network type indication information or the network requirement information, that the target network type is a sliced network, where the network request carries the network requirement information.

The network request is used to instruct the target network management unit to allocate or create, to or for the service based on the network requirement information, a network slice that meets the network requirement information.

In some possible designs, before sending, using the transceiver module, the network request to the target network management unit in the at least one first network management unit after determining, based on the network type indication information or the network requirement information, that the target network type is a sliced network, the processing module is further configured to determine the target network management unit in the at least one first network management unit, where the target network management unit has a capability of carrying the service. For example, the target network management unit may be determined based on locally stored network capability information of each first network management unit.

In some possible designs, before determining the target network management unit in the at least one first network management unit, the processing module is further configured to: send, using the transceiver module, a network capability request to the at least one first network management unit, where the network capability request is used to obtain current network capability information of the at least one first network management unit; receive, using the transceiver module, a network capability request response sent by the at least one first network management unit, where each network capability request response carries a first network management unit identifier and network capability information corresponding to the first network management unit identifier; and update locally stored network capability information of each first network management unit based on the at least one received network capability request response.

Another aspect of the embodiments of this application provides a service management apparatus, including at least one connected processor, memory, and transceiver. The memory is configured to store program code, and the processor is configured to invoke the program code in the memory, to perform the methods according to the foregoing aspects.

Another aspect of the embodiments of this application provides a computer storage medium including an instruction. When the instruction is run on a computer, the computer is enabled to perform the methods according to the foregoing aspects.

Another aspect of the embodiments of this application provides a computer program product including an instruction. When the computer program product is run on a computer, the computer is enabled to perform the methods according to the foregoing aspects.

Compared with an existing mechanism, in the solutions provided in the embodiments of this application, after receiving the service management request that carries the network type indication information or the service requirement information, the service management unit may determine, based on the network type indication information or the service requirement information, whether the type of the network that serves the service is a sliced network. In this way, a manual determining workload is reduced, such that subsequently, the service management unit can perform a corresponding procedure in a targeted and accurate manner based on the determined network type, service management can be optimized, and service deployment efficiency can be improved.

DESCRIPTION OF EMBODIMENTS

Figure 1:
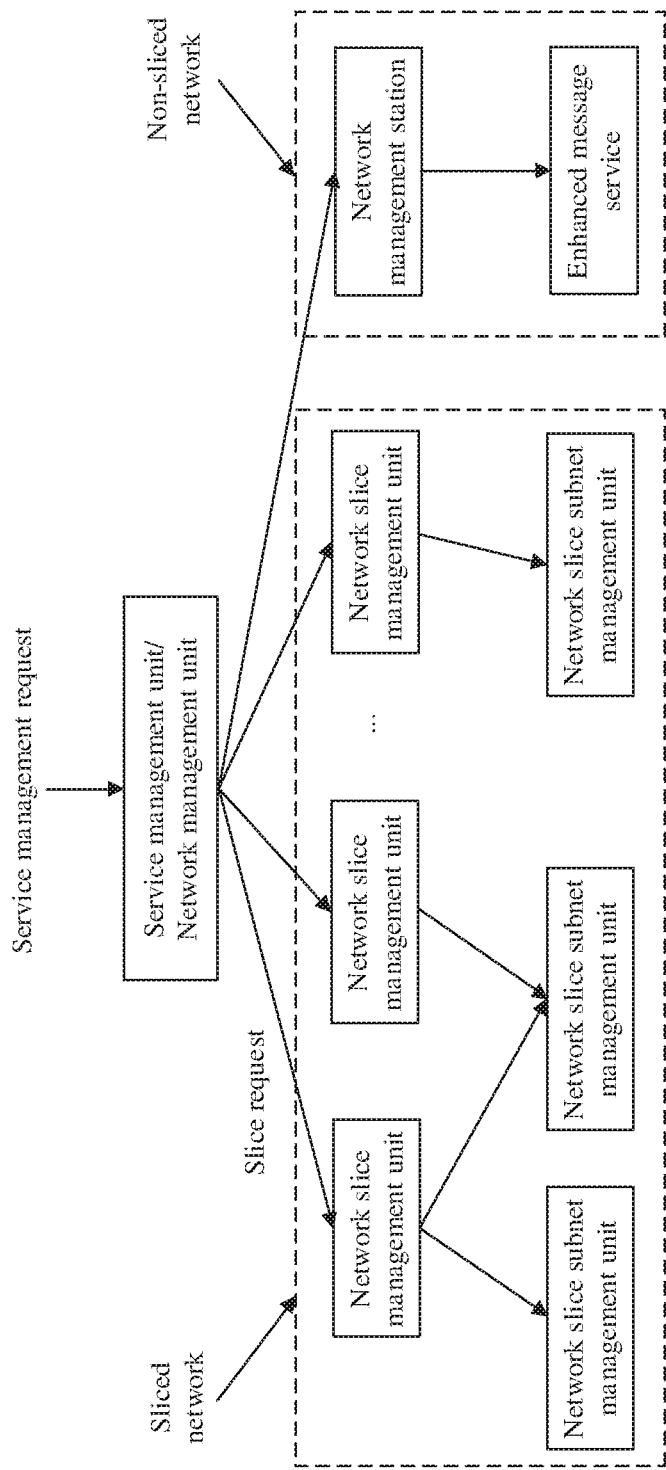
FIG. 1 is a schematic diagram of a network architecture according to an embodiment of this application.

In the specification, claims, and accompanying drawings of this application, the terms "first", "second", and the like are intended to distinguish between similar objects but do not necessarily indicate a specific order or sequence. It should be understood that the data used in such a way are interchangeable in proper circumstances such that the embodiments described herein can be implemented in other orders than the order illustrated or described herein. In addition, the terms "include", "have", or any other variant thereof are intended to cover a non-exclusive inclusion. For example, a process, a method, a system, a product, or a device that includes a series of steps or modules is not necessarily limited to the steps or modules that are expressly listed, but may include another step or module not expressly listed or inherent to the process, the method, the product, or the device. The module division in this application is merely logical division, and there may be another division during implementation in actual application. For example, a plurality of modules may be combined or integrated into another system, or some features may be ignored or not performed. In addition, the displayed or discussed mutual couplings or direct couplings or communication connections may be implemented through some interfaces. The indirect couplings or communication connections between the modules may be implemented in electric or another form, and this is not limited in this application. In addition, modules or sub-modules described as separate components may be or may not be physically separated, or may be or may not be physical modules, or may be distributed into a plurality of circuit modules. Objectives of the solutions of this application may be achieved by selecting some or all of the modules based on an actual requirement.

The embodiments of this application provide a service management method and apparatus, and a storage medium. The embodiments of this application are based on an end-to-end network slicing technology, and are applied to communication services such as a business to business (B2B) service, a customer to customer (C2C) service, an internet of vehicles service, an enhanced mobile broadband (eMBB) service, a machine type communication (MTC) service, an enhanced machine type communication (eMTC) service, a massive machine type communication (mMTC) service, an internet of things (IoT) service, or an ultra-reliable low-latency communication (URLLC) service. Detailed descriptions are provided below.

A network slice is an end-to-end network slice individually managed on a management plane. To be more specific, a network slice refers to a communications resource ensuring that a carried service can meet a requirement of a service level requirement (SLR). Hard isolation (physical isolation) or soft isolation (logical isolation) may be performed on these communications resources according to different requirements. It may be considered that one network slice is a combination of network functions and resources required for completing one or more services, and the network slice is a complete logical network. Network slices can meet special requirements of different industries and different tenants for a network, and different network slices need to be respectively allocated to tenants, such that the tenants are completely isolated from each other through slicing.

A service is a communication service that is of a specified SLR and that can be shared by a group of users, such as mobile broadband (MBB), voice, IoT, smart parking, and smart metering, and may also be referred to as a tenant service.

A tenant is a renter of an operator network. For example, if an electric power company rents a network of an operator to deploy a smart metering service, it may be considered that the electric power company is a tenant of the operator. One tenant may correspond to a plurality of users. For example, an electric power company provides an electric service for the plurality of users.

Figure 2:
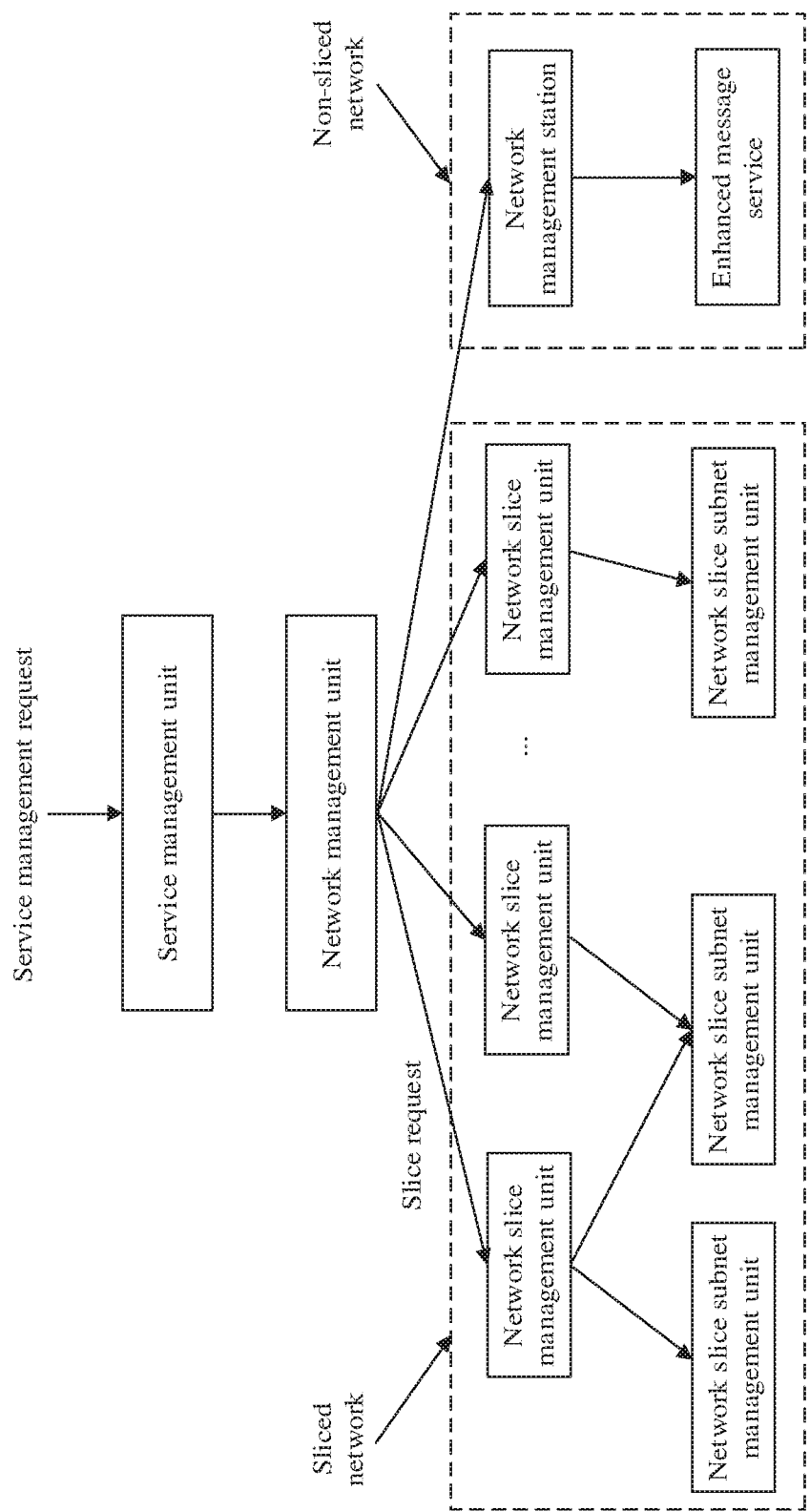
FIG. 2 is another schematic diagram of a network architecture according to an embodiment of this application.

FIG. 1 and FIG. 2 are schematic diagrams of two system architectures according to embodiments of this application. In FIG. 1, a service management unit (e.g., a communication service management function (CSMF)) or a network management (NM) receives a service management request. The service management request is used to indicate a network type of a service. When it is determined that a network type of a tenant service is a sliced network, the CSMF or the NM may send a slice request to a selected slice management unit. Then, the slice management unit allocates or creates a proper network slice to or for the tenant service, and feeds back the network slice to the CSMF or the NM. For ease of network slice management, the selected slice management unit may also be a cross-domain network slice management function (NSMF), and the NSMF may send a slice request to network slice subnet management units (NSSMF) managed by the NSMF, such that the NSSMFs allocate a proper network slice to the tenant service.

In FIG. 2, a CSMF receives a service management request, and the CSMF sends a network management request to an NM based on the service management request. The NM receives the network management request. The network management request is used to indicate a network type of a service. When it is determined that a network type of a tenant service is a sliced network, the NM may send a slice request to selected NSMFs. Then, the NSMFs allocate or create a proper network slice to or for the tenant service, and feed back the network slice to the NM. For ease of network slice management, the selected NSMF may further send a slice request to NSSMFs managed by the NSMF, such that the NSSMFs allocate a proper network slice to the tenant service.

It should be noted that the CSMF, the NM, and the NSMF are logical functional units, and corresponding entities are not limited in this application.

To resolve the foregoing technical problem, this application provides the following technical solutions.

When a sliced network and a non-sliced network coexist, the service management unit may automatically determine, based on service information (which may include network type indication information and service requirement information) provided by a tenant service management unit, whether to currently select a sliced network or a non-sliced network. In addition, the service management unit may further select, based on network capability information of a first network management unit, the first network management unit that is currently suitable to provide a sliced network for the tenant service.

Figure 3:
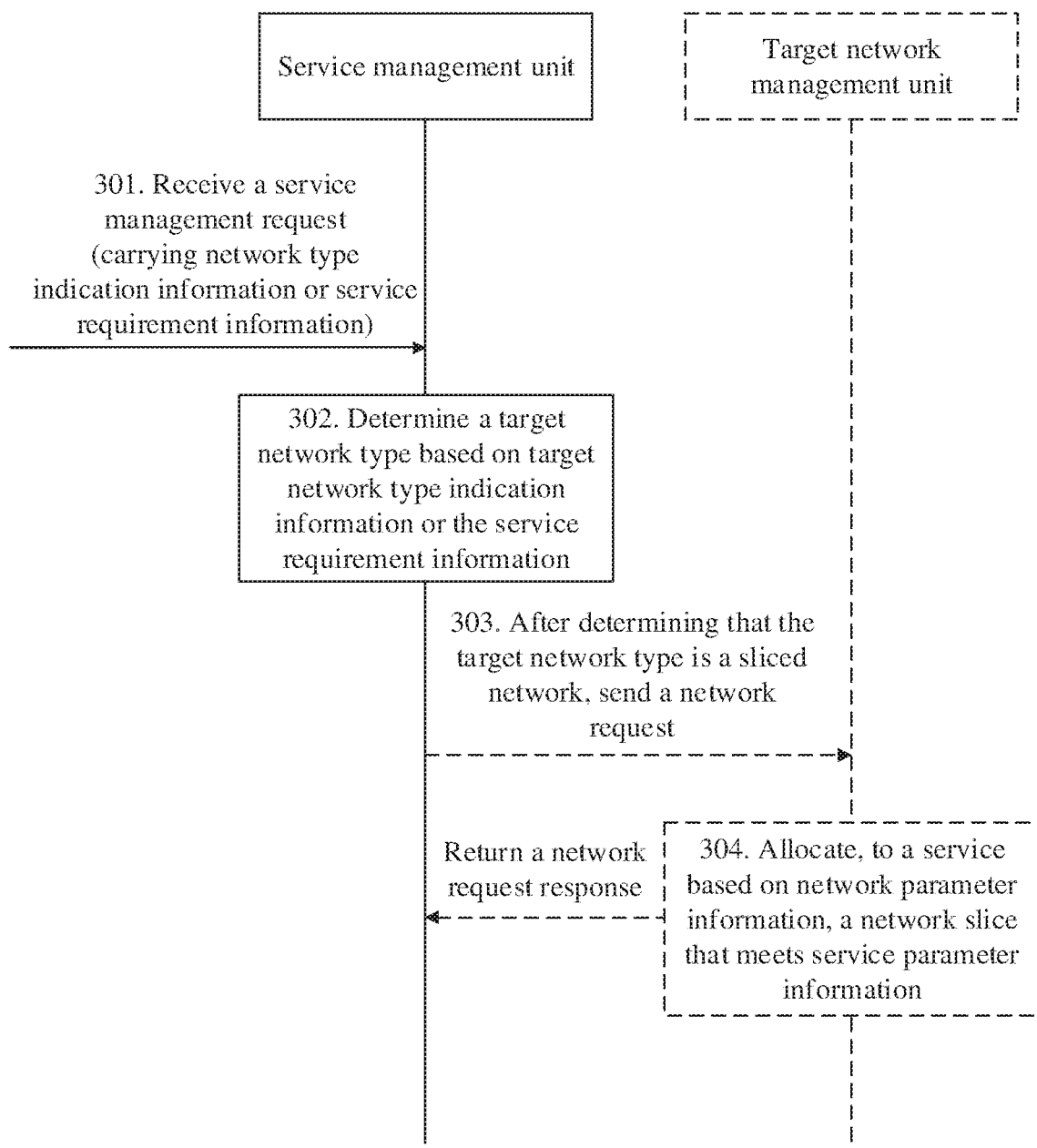
FIG. 3 is a schematic flowchart of a service management method according to an embodiment of this application.

Referring to FIG. 3, the following describes a service management method provided in this application using an example. The method is used in a service management system, the service management system includes a management unit and at least one first network management unit. The management unit includes a service management unit, and the management unit may further include a second network management unit. The service management unit and the second network management unit may be separately deployed or deployed in a centralized manner. This is not specifically limited in this application. The method includes the following steps.

301. The management unit receives a service management request.

The service management request includes network type indication information and service requirement information. In some implementations, the network type indication information is used to indicate a type of a network that serves a service. For example, when "indicator=1" is directly indicated, it may indicate that a sliced network needs to be used for the service, and when "indicator=0" is indicated, it may indicate that a non-sliced network needs to be used for the service. Alternatively, when "indicator=Y" is directly indicated, it may indicate that a sliced network needs to be used for the service, and when "indicator=N" is indicated, it may indicate that a non-sliced network needs to be used for the service.

In some implementations, the service requirement information may include: a service level, a service type, a tenant level, an isolation requirement, a throughput, coverage, a quantity of users, a latency requirement, quality of service, a service security level, a tenant identifier, a service identifier, or the like. The service identifier may indicate the service type of the service, and the tenant identifier corresponds to the tenant level.

302. The management unit determines a target network type based on the network type indication information and the service requirement information.

The network type refers to a sliced network or a non-sliced network. That is, the management unit may determine, based on the network type indication information and the service requirement information, whether the target network type is a sliced network or a non-sliced network.

In some embodiments of this application, when the management unit includes the service management unit and the second network management unit, the service management request in step 301 is received by the network requirement information, and the target network type may be determined by the service management unit or the second network management unit.

In an implementation, after the service management unit receives the service management request, the service management unit determines the target network type based on the network type indication information or the service requirement information carried in the service management request.

In an implementation, after receiving the service management request, the service management unit converts the service requirement information in the service management request into network requirement information, and then sends a network management request to the second network management unit. The network management unit determines the target network type based on the network type indication information or the network requirement information carried in the network management request. The network requirement information includes at least one of the following: a latency requirement of a target network, a quantity of users that need to access the target network, a security requirement of the target network, an isolation requirement of the target network, a bandwidth requirement of the target network, a throughput of the target network, coverage of the target network, or quality of service of the target network.

In some embodiments of this application, when the service management unit determines the target network type, the service management unit may determine the target network type based on the network type indication information or the service requirement information in the following two implementations.

(1) The service management unit determines the target network type based on the network type indication information. For a flowchart, refer to FIG. 4.

Figure 4:
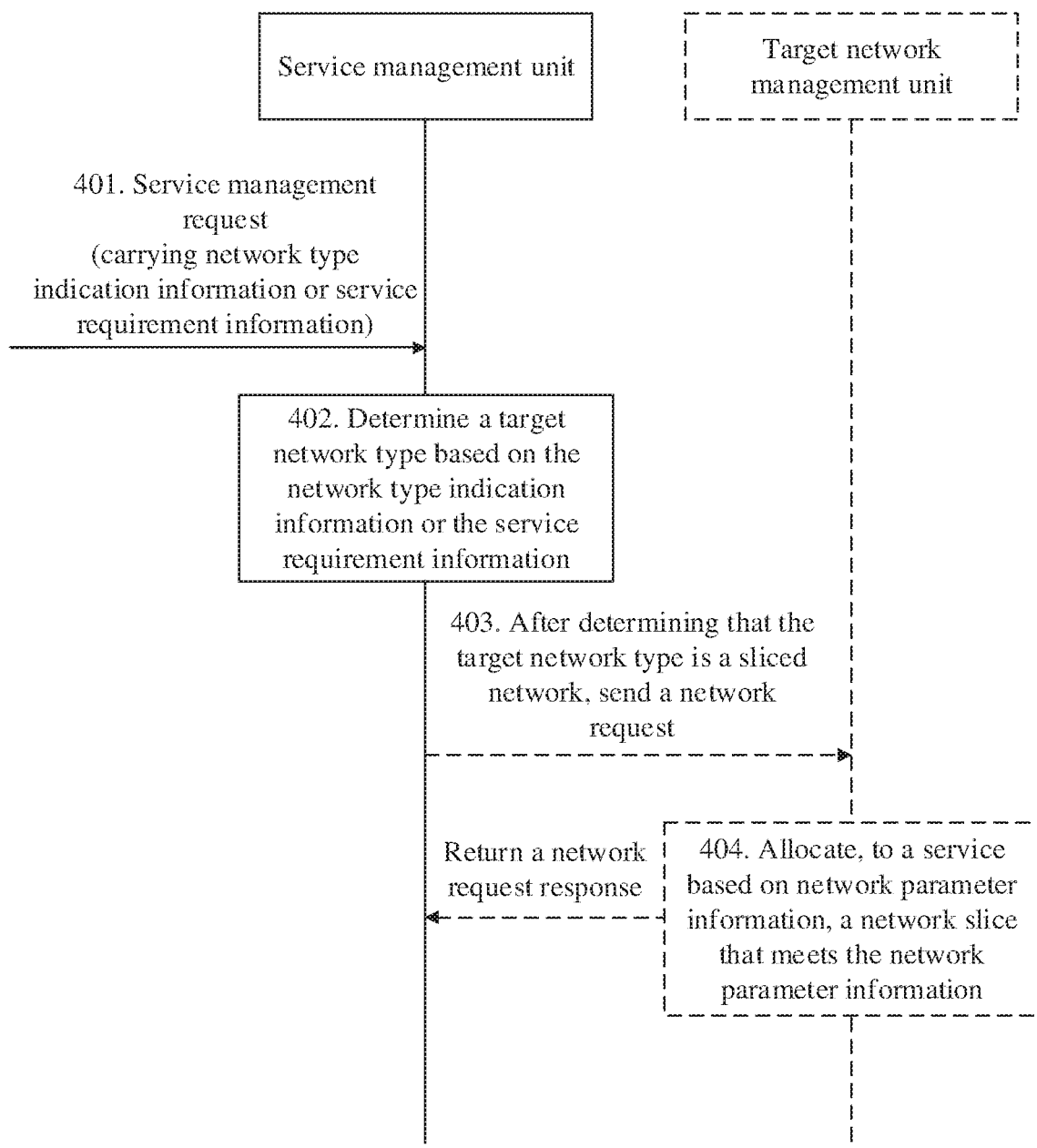
FIG. 4 is another schematic flowchart of a service management method according to an embodiment of this application.

FIG. 4 includes the following procedure.

401. A service management unit receives a service management request.

The service management request carries network type indication information or service requirement information.

402. The service management unit determines a target network type based on the network type indication information or the service requirement information.

403. After determining that the target network type is a sliced network, the service management unit sends a network request to a target network management unit.

The network request carries network parameter information.

404. The target network management unit allocates, to a service based on the network parameter information, a network slice that meets the network parameter information, and returns a network request response to the service management unit.

The service management unit may determine the target network type based on the network type indication information in at least one of the following implementations.

If the target network type indicated in the network type indication information is a sliced network, the service management unit determines that the target network type is a sliced network.

If the target network type indicated in the network type indication information is a non-sliced network, the service management unit determines that the target network type is a non-sliced network.

For example, when "indicator=1" is indicated in the network type indication information, the service management unit may determine that a sliced network needs to be used for the service. When "indicator=0" is indicated in the network type indication information, the service management unit may determine that a non-sliced network needs to be used for the service.

It can be learned that the service management unit can accurately and quickly determine, directly based on the network type indication information, whether a sliced network needs to be used for a service, to correspondingly serve the service in a targeted manner in a subsequent procedure, thereby improving service management efficiency.

(2) The service management unit determines the target network type based on the service requirement information. For a flowchart, refer to FIG. 4.

For example, the service management unit may determine the target network type based on the service requirement information and a preset policy, where the preset policy includes an association relationship between a network type and service requirement information.

In some implementations, the association relationship between a network type and service requirement information includes at least one of the following: an association relationship between a service level and a network type; an association relationship between a service type and a network type; an association relationship between a tenant level and a network type; an association relationship between an isolation requirement and a network type; an association relationship between a throughput and a network type; an association relationship between coverage and a network type; an association relationship between a quantity of users and a network type; an association relationship between a latency requirement and a network type; an association relationship between quality of service and a network type; or an association relationship between a service security level and a network type.

Correspondingly, the service management unit may determine, based on the service requirement information and the foregoing association relationships between network types and service requirement information in at least one of the following implementations, that the target network type is a sliced network.

If the service type in the service requirement information is a service type that needs to be implemented using a sliced network, the service management unit determines that the target network type is a sliced network. For example, it may be predefined that a sliced network needs to be used for a particular service such as an eMBB service, an MTC service, an eMTC service, an mMTC service, an IoT service, or a URLLC service. When the service type in the service requirement information is one of these service types, it indicates that a sliced network needs to be used for the service.

If the service level in the service requirement information is a service level that needs to be implemented using a sliced network, the service management unit determines that the target network type is a sliced network. For example, it may be predefined that a service whose service level is higher than a preset service level needs to be implemented using a sliced network.

If the tenant level in the service requirement information is a tenant level that needs to be implemented using a sliced network, the service management unit determines that the target network type is a sliced network. For example, it may be predefined that a sliced network needs to be used for a service whose tenant level is higher than a preset tenant level.

The isolation requirement may be represented by a service isolation level. If a service isolation level of the service is a service isolation level that needs to be implemented using a sliced network, the service management unit determines that the target network type is a sliced network. For example, it may be predefined that a sliced network needs to be used for a service whose service isolation level is higher than a preset service isolation level.

For example, when the service isolation level indicated in the network type indication information is classified into 10 isolation levels, it is predefined that a sliced network needs to be used for a service whose service isolation level is not lower than 7. In this case, when the network type indication information indicates that the service isolation level of the service is 8, the service management unit may determine that a sliced network needs to be used for the service.

If a latency indicated in the latency requirement in the service requirement information is lower than a preset latency, the service management unit determines that the target network type is a sliced network. For example, it may be predefined that a sliced network needs to be used for a service whose latency is lower than the preset latency.

If the quantity of users in the service requirement information is a quantity of users that needs to be implemented using a sliced network, the service management unit determines that the target network type is a sliced network. For example, it may be predefined that a sliced network needs to be used for a service whose quantity of users is higher than a preset quantity of users.

If the quality of service in the service requirement information is quality of service that needs to be implemented using a sliced network, the service management unit determines that the target network type is a sliced network. For example, it may be predefined that a sliced network needs to be used for a service whose quality of service is higher than preset quality of service.

If the service security level in the service requirement information is a service security level that needs to be implemented using a sliced network, the service management unit determines that the target network type is a sliced network. For example, it may be predefined that a sliced network needs to be used for a service whose service security level is higher than a preset service security level.

For example, when the isolation level is classified into isolation levels from 1 to 10, it is predefined that a sliced network needs to be used for a service whose isolation level is not lower than 7. In this case, when the isolation level in the service requirement information is 8, the service management unit may determine that a sliced network needs to be used for the service.

For another example, when the service type in the service requirement information is a particular service such as an eMBB service, an MTC service, an eMTC service, an mMTC service, an IoT service, or a URLLC service, the service management unit may determine that a sliced network needs to be used for the service.

It can be learned that the service management unit in this embodiment of this application can accurately and quickly determine, directly based on one or more parameters in the service requirement information, whether a sliced network needs to be used for the service, to provide a corresponding target network for the service in a targeted manner in a subsequent procedure, thereby improving service management efficiency.

(3) The service management unit determines the target network type based on the network requirement information.

For example, the service management unit may first convert the service requirement information into network requirement information, and then determine the target network type based on the network requirement information.

In some implementations, the service management unit may determine the target network type based on the network requirement information and a preset policy, where the preset policy may further include an association relationship between a network type and network requirement information. The network requirement information includes at least one of the following: a latency requirement of a target network, a quantity of users that need to access the target network, a security requirement of the target network, an isolation requirement of the target network, a bandwidth requirement of the target network, a throughput of the target network, coverage of the target network, or quality of service of the target network.

In some implementations, the association relationship between a network type and network requirement information includes at least one of the following: an association relationship between a latency requirement of a network and a network type; an association relationship between a quantity of users that need to access a network and a network type; an association relationship between a security requirement of a network and a network type; an association relationship between an isolation requirement of a network and a network type; an association relationship between a bandwidth requirement of a network and a network type; an association relationship between a throughput of a network and a network type; an association relationship between coverage of a network and a network type; or an association relationship between quality of service of a network and a network type.

For example, the service management unit may determine, based on the foregoing association relationships between network types and network requirement information in at least one of the following implementations, that the target network type is a sliced network.

If the latency requirement of the target network is lower than a preset latency, the service management unit determines that the target network type is a sliced network. For example, it may be predefined that a sliced network needs to be used for a service whose latency is lower than the preset latency, and it may be determined that the target network that a service is to access is a sliced network.

If the quantity of users that need to access the target network is a quantity of users that need to be implemented using a sliced network, the service management unit determines that the target network type is a sliced network. For example, it may be predefined that a sliced network needs to be used for a service whose quantity of users is higher than a preset quantity of users, and then, it may be determined that the target network that a service is to access is a sliced network.

The security requirement of the network may be represented by a network security level. If a network security level of the target network is a network security level that needs to be implemented using a sliced network, the service management unit determines that the target network type is a sliced network. For example, it may be predefined that a sliced network needs to be used for a service whose network security level is higher than a preset network security level, and then, it may be determined that the target network that a service is to access is a sliced network.

The isolation requirement of the network may be represented by a network isolation level. If a network isolation level of the target network is a network isolation level that needs to be implemented using a sliced network, the service management unit determines that the target network type is a sliced network. For example, it may be predefined that a sliced network needs to be used for a service whose network isolation level is higher than a preset network isolation level, and then, it may be determined that the target network that a service is to access is a sliced network.

If the bandwidth requirement of the target network is bandwidth that needs to be implemented using a sliced network, the service management unit determines that the target network type is a sliced network. For example, it may be predefined that a sliced network needs to be used for a service whose bandwidth is higher than preset bandwidth, and then, it may be determined that the target network that a service is to access is a sliced network.

If the quality of service of the target network is quality of service that needs to be implemented using a sliced network, the service management unit determines that the target network type is a sliced network. For example, it may be predefined that a sliced network needs to be used for a service whose quality of service is higher than preset quality of service, and then, it may be determined that the target network that a service is to access is a sliced network.

It can be learned that the service management unit in this application can accurately and quickly determine, directly based on one or more parameter values in the network requirement information and the foregoing association relationships between network types and network requirement information, whether a sliced network needs to be used for the service, to provide a corresponding network slice for the service in a targeted manner in a subsequent procedure, thereby improving service management efficiency.

It should be noted that the network requirement information in this embodiment of this application is obtained based on the service requirement information, and parameters included in the network requirement information and the service requirement information are basically the same. Parameter values in the service requirement information are specific to a service, and parameter values in the network requirement information are specific to a requirement of the service for a network.

In some embodiments of this application, when the second network management unit determines the target network type, the second network management unit may determine, based on the network type indication information or the network requirement information carried in the network management request, the type of the network that serves the service. It should be noted that information included in the network type indication information carried in the network management request may be a part or all of information in the network type indication information carried in the service management request. This is not specifically limited in this application.

The network requirement information carried in the network management request is obtained by converting, by the service management unit, the service requirement information in the service management request. Information carried in the network requirement information may be a part or all of information in the service requirement information carried in the service management request. This is not specifically limited in this application. For descriptions of the network type indication information or the network requirement information carried in the network request response, refer to descriptions on a side of the service management unit. Details are not described again.

For example, when the network management request carries the network type indication information, the second network management unit may determine, based on the network type indication information, whether the target network type is a sliced network or a non-sliced network. When the network management request carries the network requirement information, the second network management unit may determine, based on the network requirement information, whether the target network type is a sliced network or a non-sliced network.

Figure 5:
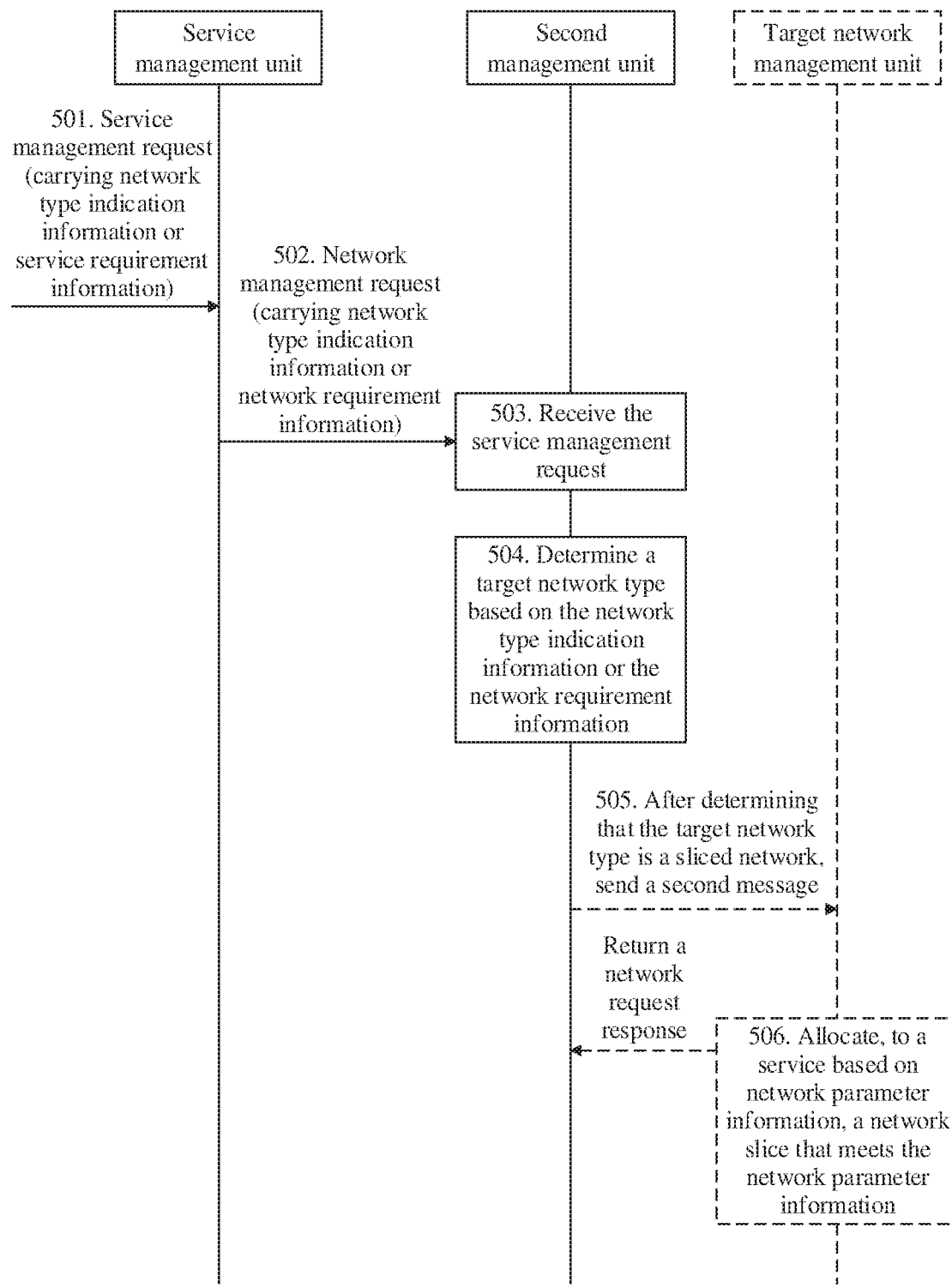
FIG. 5 is another schematic flowchart of a service management method according to an embodiment of this application.

In some embodiments of this application, when the second network management unit determines the target network type, the second network management unit may determine the target network type based on the network type indication information or the service requirement information in the following two implementations, as shown in FIG. 5.

(1) The second network management unit determines the target network type based on the network type indication information. For a procedure, refer to FIG. 5. FIG. 5 includes the following procedure.

501. A service management unit receives a service management request.

The service management request carries network type indication information or service requirement information.

502. The service management request sends a network management request to a second network management unit.

The network management request carries network type indication information or network requirement information.

503. The second network management unit receives the network management request.

504. The second network management unit determines a target network type based on the network type indication information or the network requirement information.

505. After determining that the target network type is a sliced network, the second network management unit sends a network request to a target network management unit.

The network request carries network parameter information.

506. The target network management unit allocates, to a service based on the network parameter information, a network slice that meets the network parameter information, and returns a network request response to the second network management unit.

For example, if the network type indicated in the network type indication information is a sliced network, the second network management unit determines that the target network type is a sliced network.

If the network type indicated in the network type indication information is a non-sliced network, the second network management unit determines that the target network type is a non-sliced network.

It can be learned that the second network management unit can accurately and quickly determine, directly based on the network type indication information, whether a sliced network needs to be used for a service, to correspondingly serve the service in a targeted manner in a subsequent procedure, thereby improving service management efficiency.

(2) The second network management unit determines the target network type based on the network requirement information.

For a procedure, refer to FIG. 5. In some implementations, the second network management unit may determine the target network type based on the network requirement information and a preset policy. The preset policy further includes an association relationship between a network type and network requirement information. Refer to descriptions of the service management unit. Details are not described herein again.

For example, the second network management unit may determine, based on the association relationship between a network type and network requirement information and the network requirement information in at least one of the following implementations, that the target network type is a sliced network.

If the latency requirement of the target network is lower than a preset latency, the service management unit determines that the target network type is a sliced network.

If the quantity of users that need to access the target network is a quantity of users that need to be implemented using a sliced network, the service management unit determines that the target network type is a sliced network. For example, it may be predefined that a sliced network needs to be used for a service whose quantity of users is higher than a preset quantity of users.

The security requirement of the network may be represented by a network security level. If a network security level of the target network is a network security level that needs to be implemented using a sliced network, the service management unit determines that the target network type is a sliced network. For example, it may be predefined that a sliced network needs to be used for a service whose network security level is higher than a preset network security level.

The isolation requirement of the network may be represented by a network isolation level. If a network isolation level of the target network is a network isolation level that needs to be implemented using a sliced network, the service management unit determines that the target network type is a sliced network. For example, it may be predefined that a sliced network needs to be used for a service whose network isolation level is higher than a preset network isolation level.

If the bandwidth requirement of the target network is bandwidth that needs to be implemented using a sliced network, the service management unit determines that the target network type is a sliced network. For example, it may be predefined that a sliced network needs to be used for a service whose bandwidth is higher than preset bandwidth.

If the quality of service of the target network is quality of service that needs to be implemented using a sliced network, the service management unit determines that the target network type is a sliced network. For example, it may be predefined that a sliced network needs to be used for a service whose quality of service is higher than preset quality of service.

It can be learned that the second network management unit in this application can accurately and quickly determine, directly based on one or more parameter values in the network requirement information and the association relationship between a network type and network requirement information, whether a sliced network needs to be used for the service, to correspondingly serve the service in a targeted manner in a subsequent procedure, thereby improving service management efficiency.

Optionally, in some embodiments of this application, after the management unit (including the service management unit or the second network management unit) determines the target network type, the management unit (including the service management unit or the second network management unit) may further select a proper first network management unit to allocate a network slice instance (NSI) to the service, that is, an operation shown in the following step 303.

303: After the management unit determines that the target network type is a sliced network, the service management unit sends a network request to the target network management unit in the at least one first network management unit.

The network request carries the network requirement information.

When the target network type is determined by the service management unit, after the service management unit determines, based on the network type indication information or the service requirement information, that the target network type is a sliced network, the service management unit sends the network request to the target network management unit in the at least one first network management unit.

When the target management unit is determined by the second network management unit, after the second network management unit determines, based on the network type indication information or the network requirement information, that the target network type is a sliced network, the second network management unit sends the network request to the target network management unit in the at least one first network management unit.

The network request is used to instruct the target network management unit to allocate, to the service based on the network parameter information, a network slice that meets the network parameter information.

Similarly, after the management unit determines that the target network type is a non-sliced network, the management unit may further send a network request to the target network management unit in the at least one first network management unit. The network request also carries the network requirement information, to instruct the target network management unit to allocate, to the service, a target network that meets the network requirement information.

304. The target network management unit allocates, to a service based on the network parameter information, a network slice that meets the network parameter information, and returns a network management request response to the management unit.

The network management request response is used to inform the management unit that the target network management unit may allocate a proper network slice to the service.

Compared with an existing mechanism, in the solutions provided in this application, after receiving the service management request that carries the network type indication information or the service requirement information, the service management unit may determine, based on the network type indication information or the service requirement information, whether the target network type is a sliced network. Alternatively, after receiving the network management request that carries the network type indication information or the network requirement information, the second network management unit may determine, based on the network type indication information or the network requirement information, whether the target network type is a sliced network. In this way, a manual determining workload is reduced, such that subsequently, the management unit (the service management unit or the second network management unit) can perform a corresponding procedure in a targeted and accurate manner based on the determined network type, service access management can be optimized, and service deployment efficiency can be improved. In addition, compared with an existing mechanism in which two separate management systems are needed to respectively manage a sliced network and a non-sliced network, and whether a sliced network needs to be used for a service cannot be quickly determined, in the embodiments of this application, the service management unit or the second network management unit may perform service management on both a sliced network and a non-sliced network, to implement management centralization.

Optionally, in some embodiments of the present disclosure, after the service management unit or the second network management unit determines that the target network type is a sliced network, and before the service management unit or the second network management unit sends, to the target network management unit in the at least one first network management unit, the network request that carries the service requirement information, the service management unit may further determine the target network management unit in the at least one first network management unit. The target network management unit has a capability of carrying the service. After determining target network management units, the service management unit may separately send network requests to these target network management units. In some implementations, the management unit (including the service management unit or the second network management unit) may determine the target network management unit based on locally stored network capability information of the first network management unit. The management unit (including the service management unit or the second network management unit) may obtain the network capability information periodically or in an event-triggered manner. This is not specifically limited in this embodiment of this application.

Optionally, there may be one or more target network management units determined by the service management unit or the second network management unit. The network capability information may include at least one of the following: network slice instance capability information, network slice instance information, or network slice template information.

The network slice instance capability information may include two types of information.

Type 1: network slice instance capability information that is existing in and available to the first network management unit; and Type 2: network slice instance capability information that is newly created by the first network management unit based on network slice template information maintained by the first network management unit. For example, the network slice instance capability information may include at least one of the following parameters: parameters such as a latency, a loan, a priority, a security level, service reliability, a user experience rate, location information, or a quantity of users that can be carried.

The network slice template information includes one or more parameters.

The network slice instance information is generated based on the network slice template information. For example, if the network slice template information includes one parameter: a latency, a network slice instance may be correspondingly generated, and a latency that can be supported by the network slice instance is a latency in the network slice instance.

Because the network slice instance capability information, the network slice instance information, and the network slice template information can truly and accurately reflect a current real service capability of the first network management unit, the network slice instance capability information, the network slice instance information, and the network slice template information are provided for the service management unit, such that the service management unit can more accurately select the first network management unit suitable to carry the service.

It can be learned that, that the target network management unit is selected in this manner can improve processing efficiency of sliced network allocation. The management unit (including the service management unit or the second network management unit) may further first determine a first network management unit that is currently capable of providing a network slicing service for the service, to reduce message sending and select a proper target network management unit in a targeted, accurate, and quick manner, thereby improving service deployment efficiency.

After determining the target network management units, the management unit (including the service management unit or the second network management unit) may separately send the network requests to these target network management units.

Optionally, in some embodiments of the disclosure, to improve processing efficiency of sliced network allocation, the service management unit may further first determine a first network management unit that is currently capable of providing a network slicing service for the service, to reduce message sending and quickly select a proper target network management unit.

For example, the service management unit may further send a network capability request to the at least one first network management unit, and the network capability request is used to instruct the network management unit that receives the network capability request to feed back current network capability information. The network capability request instructs the network management unit to feed back a part or all of the current network capability information of the network management unit. The network capability request instructs the network management unit to feed back a part or all of the current network capability information of the network management unit, and the network capability information includes network slice instance capability information and network slice instance information.

The at least one first network management unit sends a network capability request response to the management unit (including the service management unit or the second network management unit), and each network capability request response may carry a network management unit identifier and network capability information corresponding to the network management unit identifier.

After receiving the network capability request response sent by the at least one first network management unit, the management unit (including the service management unit or the second network management unit) updates locally stored network capability information of each first network management unit based on the at least one received network capability request response.

After updating the locally stored network capability information, the management unit (including the service management unit or the second network management unit) may determine, in the at least one first network management unit based on network capability information of each of the at least one first network management unit, a network management unit that meets a service requirement of the service. The network management unit that meets a service requirement of the service is the target network management unit.

It can be learned that, on one hand, the first network management unit feeds back network capability information of the first network management unit in real time to the management unit (including the service management unit or the second network management unit), such that when a service that needs to be implemented using a sliced network needs to perform access, the management unit (including the service management unit or the second network management unit) can quickly and accurately determine a proper target network management unit based on the network capability information of each first network management unit, service access processing efficiency is effectively improved, and waiting duration of a user is reduced. On the other hand, because the network slice instance capability information, the network slice instance information, and the network slice template information can truly and accurately reflect a current real service capability of each first network management unit, the network slice instance capability information, the network slice instance information, and the network slice template information are provided for the management unit, such that the management unit can more accurately select a target network management unit suitable to carry the service, thereby improving service processing efficiency.

It should be noted that, in this application, the service management unit or the second network management unit may obtain the network capability information periodically or in an event-triggered manner.

(1) Periodic Obtaining

The service management unit or the second network management unit may update the locally stored network capability information in any period of time in an entire service process. For example, it may be defined that a CSMF/NM periodically triggers sending of the network capability request to an NSMF, to obtain latest network slice capability information.

(2) Obtaining in an Event-Triggered Manner

For example, when there is a new service request, a CSMF/NM is triggered to send the network capability request to an NSMF.

If the CSMF requests the NSMF to feed back a latency capability of the NSMF, a response message returned by the NSMF to the CSMF may include a latency.

If the CSMF requests the NSMF to feed back a latency capability, location information, and a tenant identifier of the NSMF, a response message returned by the NSMF to the CSMF may include information such as a latency (20 milliseconds), a location (a location label 100 on a map), and a quantity (200000) of tenants.

On one hand, the service management unit or the second network management unit obtains the network capability information of the first network management unit periodically or in an event-triggered manner, to obtain a capability for each first network management unit to currently carry a service, thereby reducing a range for selecting the target network management units, requesting these target network management units in a targeted manner to allocate a proper network slice to a service, and improving processing efficiency of sliced network allocation. On the other hand, the service management unit or the second network management unit may further first determine a first network management unit that is currently capable of providing a network slicing service for the service, to reduce message sending and quickly select a proper target network management unit.

It can be learned that the CSMF may request a part or all of NSI capability information that can be currently supported by the NSMF. Subsequently, the CSMF/NM updates locally maintained NSI capability information of the NSMF based on the received NSI capability information, and then determines, based on at least one of the updated NSI capability information, the network type indication information, or the service requirement information, whether a slice needs to be used. When the service management request carries both the network type indication information and the service requirement information, whether the service is a sliced network is determined based on an indication of the network type indication information.

For example, the service requirement information indicates that a quantity of users of the service is 10000, but actually, a predefined condition for using a sliced network is not met. However, if the network type indication information in the service management request indicates that a sliced network needs to be used for the service, the network type indication information needs to be based on, that is, it is determined that a sliced network needs to be used for the service. Other cases are similar to this, and details are not described again.

Correspondingly, if the service latency indicated in the service requirement information is 20 milliseconds (ms), the CSMF may determine, based on the currently updated NSI capability information of the NSMF, NSMFs whose current NSI latencies are not higher than 20 ms, determine the NSMFs whose latencies are 20 ms as target NSMFs, and then send network requests to the target NSMFs, such that the target NSMFs allocate a proper NSI to the service based on the service requirement information in the network request. The NSI may be newly created for the service, or an existing NSI may be directly allocated to the service. Alternatively, when there is no proper NSI for the current target NSMF, a new NSI is created for the service. This is not specifically limited in this application. After allocating the NSI to the service, the target NSMF may send a response to the CSMF or the NM, to inform the CSMF or NM that the target NSMF may allocate a proper NSI to the service.

There may be at least two target NSMFs. Therefore, after receiving the responses returned by the target NSMFs, the CSMF may select any target NSMF to allocate the NSI to the service. A specific selection manner is not limited in this application.

In some embodiments of this application, after receiving, by a first network management unit, a network request sent by the management unit (including the service management unit or the second network management unit), and before allocating or creating, by the first network management unit to or for the service based on the network requirement information, a network slice that meets the network requirement information, the method further includes the following.

The first network management unit determines, based on the network requirement information and current network capability information of the first network management unit, whether the first network management unit has a capability of carrying the service.

If it is determined that the first network management unit has the capability of carrying the service, the first network management unit sends the network request response to the management unit (including the service management unit or the second network management unit). According to this determining mechanism and feedback mechanism, accurate information can be provided for the management unit (including the service management unit or the second network management unit), such that the management unit (including the service management unit or the second network management unit) selects a proper first network management unit in a targeted manner to provide a network slice for the service.

The service management method in this application is described above, and the following describes a service management apparatus. The apparatus may be used in a service management system. The service management system includes a management unit and at least one first network management unit. The management unit includes a service management unit, and may further include a second network management unit.

Figure 6:
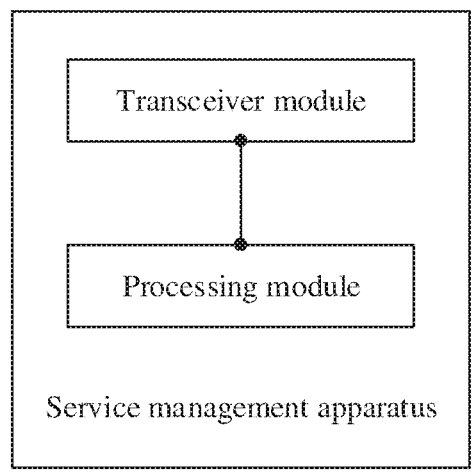
FIG. 6 is a schematic structural diagram of a service management apparatus according to an embodiment of this application.

Referring to FIG. 6, a service management apparatus is described. The service management apparatus may be a service management unit, or may be a serving end installed on the service management unit. The service management apparatus is configured to perform the method performed by the service management unit in the embodiment corresponding to any one of FIG. 2 to FIG. 5. In some implementations, the service management apparatus includes: a transceiver module configured to receive a service management request, where the service management request carries network type indication information or service requirement information; and a processing module configured to determine a target network type based on the network type indication information or the service requirement information, where a target network corresponding to the target network type is configured to provide a service, and the target network type includes a sliced network or a non-sliced network. The network type indication information is used to indicate the target network type.

The network type indication information is used to indicate the target network type.

In some embodiments of this application, the service requirement information includes at least one of the following information: a service level, a service type, a tenant level, an isolation requirement, a throughput, coverage, a quantity of users, a latency requirement, quality of service, a service security level, a tenant identifier, or a service identifier. The service identifier may indicate the service type of the service, and the tenant identifier corresponds to the tenant level.

In some embodiments of this application, the processing module may determine the target network type in the following three implementations.

(a) The processing module determines the target network type based on the network type indication information.

(b) In some embodiments of this application, when the service management request includes the service requirement information, the processing module converts the service requirement information into network requirement information, and then determines, based on the network requirement information, that the target network type is a sliced network.

In some embodiments of this application, the processing module determines the target network type based on the network requirement information and a preset policy, where the preset policy includes an association relationship between a network type and network requirement information.

The network requirement information may include at least one of the following: a latency requirement of the target network, a quantity of users that need to access the target network, a security requirement of the target network, an isolation requirement of the target network, a bandwidth requirement of the target network, a throughput of the target network, coverage of the target network, or quality of service of the target network.

Correspondingly, in some possible designs, the association relationship between a network type and network requirement information includes at least one of the following: an association relationship between a latency requirement of a network and a network type; an association relationship between a quantity of users that need to access a network and a network type; an association relationship between a security requirement of a network and a network type; an association relationship between an isolation requirement of a network and a network type; an association relationship between a bandwidth requirement of a network and a network type; an association relationship between a throughput of a network and a network type; an association relationship between coverage of a network and a network type; or an association relationship between quality of service of a network and a network type.

(c) The processing module determines the target network type based on the service requirement information.

The processing module is configured to determine the target network type based on the service requirement information and a preset policy, where the preset policy includes an association relationship between a network type and service requirement information.

In some implementations, the association relationship between a network type and service requirement information includes at least one of the following: an association relationship between a service level and a network type; an association relationship between a service type and a network type; an association relationship between a tenant level and a network type; an association relationship between an isolation requirement and a network type; an association relationship between a throughput and a network type; an association relationship between coverage and a network type; an association relationship between a quantity of users and a network type; an association relationship between a latency requirement and a network type; an association relationship between quality of service and a network type; or an association relationship between a service security level and a network type.

In some embodiments of this application, after determining the target network type, the processing module is further configured to send, using the transceiver module, a network request to a target network management unit in at least one first network management unit after determining, based on the network type indication information or the service requirement information, that the target network type is a sliced network.

The network request carries the network requirement information. The network request is used to instruct the target network management unit to allocate or create, to or for the service based on the network requirement information, a network slice that meets the network requirement information.

In some embodiments of this application, before sending, using the transceiver module, the network request to the target network management unit in the at least one first network management unit after determining, based on the network type indication information or the service requirement information, that the target network type is a sliced network, the processing module is further configured to determine the target network management unit in the at least one first network management unit, where the target network management unit has a capability of carrying the service. In some implementations, the processing module may determine the target network management unit based on currently obtained network requirement information and network capability information of each first network management unit.

In some embodiments of this application, the processing module is further configured to: send, using the transceiver module, a network capability request to the at least one first network management unit, where the network capability request is used to obtain current network capability information of the at least one network management unit; receive, using the transceiver module, a network capability request response sent by the at least one first network management unit, where each network capability request response carries a first network management unit identifier and network capability information corresponding to the first network management unit identifier; and update locally stored network capability information of each first network management unit based on the at least one received network capability request response.

Referring to FIG. 6, a service management apparatus is described. The service management apparatus may be the first network management unit, or may be a serving end installed on the first network management unit. The service management apparatus is configured to perform the method performed by the first network management unit in the embodiment corresponding to any one of FIG. 2 to FIG. 5. In some implementations, the apparatus is used in a service management system, and the service management system includes at least one apparatus and a second network management unit. The service management apparatus includes a transceiver module configured to receive a network request sent by the management unit (including a service management unit or the second network management unit), where the network request carries network requirement information obtained based on service requirement information, and the service requirement information is from a service management request. The service requirement information includes at least one of the following information: a service level, a service type, a tenant level, an isolation requirement, a throughput, coverage, a quantity of users, a latency requirement, quality of service, a service security level, a tenant identifier, or a service identifier. Additionally, the service identifier may indicate the service type of the service, and the tenant identifier corresponds to the tenant level. The service management apparatus further includes a processing module configured to: allocate or create, to or for the service based on the network requirement information, a network slice that meets the network requirement information; and send, using the transceiver module, a network request response to the management unit (including the service management unit or the second network management unit), where the network request response is used to indicate that the first network management unit has a capability of carrying the service.

In some possible designs, after the transceiver module receives the network request sent by the management unit (including the service management unit or the second network management unit), and before the processing module allocates or creates, to or for the service based on the network requirement information, the network slice that meets the network requirement information, the processing module is further configured to: determine, based on the network requirement information and current network capability information of the first network management unit, whether to have a capability of carrying the service; and send, using the transceiver module, the network request response to the management unit (including the service management unit or the second network management unit) if it is determined to have the capability of carrying the service. According to this determining mechanism and feedback mechanism, accurate information can be provided for the service management unit, such that the service management unit selects a proper network management unit in a targeted manner to provide a network slice for the service.

In some possible designs, the processing module is further configured to: receive, using the transceiver module, a network capability request sent by the management unit (including the service management unit or the second network management unit), where the network capability request is used to obtain current network capability information of the first network management unit; and send a network capability request response to the management unit (including the service management unit or the second network management unit) based on the network capability request, where the network capability request response carries a first network management unit identifier and the current network capability information of the first network management unit.

Network capability information of the management unit (including the service management unit or the second network management unit) is fed back in real time to the management unit, such that when a service that needs to be implemented using a sliced network needs to perform access, the service management unit or the second network management unit can select a proper target network management unit in an accurate and targeted manner.

In some possible designs, the network capability information includes at least one of the following: network slice instance capability information, network slice instance information, or network slice template information.

Because the network slice instance capability information, the network slice instance information, and the network slice template information can truly and accurately reflect a current real service capability of the first network management unit, the network slice instance capability information, the network slice instance information, and the network slice template information are provided for the service management unit or the second network management unit, and the service management unit or the second network management unit can more accurately select the target network management unit suitable to carry the service.

Referring to FIG. 6, a service management apparatus is described. The service management apparatus may be the second network management unit, and is configured to perform the method performed by the second network management unit in the embodiment corresponding to any one of FIG. 2 to FIG. 5. In some implementations, the apparatus is used in a service management system, the service management system includes a service management unit, the apparatus, and at least one first network management unit. The apparatus includes: a transceiver module configured to receive a network management request sent by a service management unit, where the network management request carries network type indication information or network requirement information; and a processing module configured to determine a target network type based on the network type indication information or the network requirement information, where the target network type includes a sliced network or a non-sliced network. The network type indication information is used to indicate the network type.

In some possible designs, the processing module is configured to determine the target network type based on the network requirement information and a preset policy, where the preset policy includes an association relationship between a network type and network requirement information.

In some possible designs, the network requirement information includes at least one of the following: a latency requirement of a target network, a quantity of users that need to access the target network, a security requirement of the target network, an isolation requirement of the target network, a bandwidth requirement of the target network, a throughput of the target network, coverage of the target network, or quality of service of the target network. In some possible designs, the association relationship between a network type and network requirement information includes at least one of the following association relationships: an association relationship between a latency requirement of a network and a network type; an association relationship between a quantity of users that need to access a network and a network type; an association relationship between a security requirement of a network and a network type; an association relationship between an isolation requirement of a network and a network type; an association relationship between a bandwidth requirement of a network and a network type; an association relationship between a throughput of a network and a network type; an association relationship between coverage of a network and a network type; or an association relationship between quality of service of a network and a network type.

In some possible designs, after determining the target network type based on the network type indication information or the network requirement information, the processing module is further configured to send, using the transceiver module, a network request to a target network management unit in the at least one first network management unit after determining, based on the network type indication information or the network requirement information, that the target network type is a sliced network, where the network request carries the network requirement information.

The network request is used to instruct the target network management unit to allocate or create, to or for the service based on the network requirement information, a network slice that meets the network requirement information.

In some possible designs, before sending, using the transceiver module, the network request to the target network management unit in the at least one first network management unit after determining, based on the network type indication information or the network requirement information, that the target network type is a sliced network, the processing module is further configured to determine the target network management unit in the at least one first network management unit, where the target network management unit has a capability of carrying the service. For example, the target network management unit may be determined based on locally stored network capability information of each first network management unit.

In some possible designs, before determining the target network management unit in the at least one first network management unit, the processing module is further configured to: send, using the transceiver module, a network capability request to the at least one first network management unit, where the network capability request is used to obtain current network capability information of the at least one first network management unit; receive, using the transceiver module, a network capability request response sent by the at least one first network management unit, where each network capability request response carries a first network management unit identifier and network capability information corresponding to the first network management unit identifier; and update locally stored network capability information of each first network management unit based on the at least one received network capability request response.

In some embodiments of this application, the network capability information includes at least one of the following: network slice instance capability information, network slice instance information, or network slice template information.

Because the network slice instance capability information, the network slice instance information, and the network slice template information can truly and accurately reflect a current real service capability of the network management unit, the network slice instance capability information, the network slice instance information, and the network slice template information are provided for the service management unit, such that the service management unit can more accurately select the target network management unit suitable to carry the service.

Figure 7:
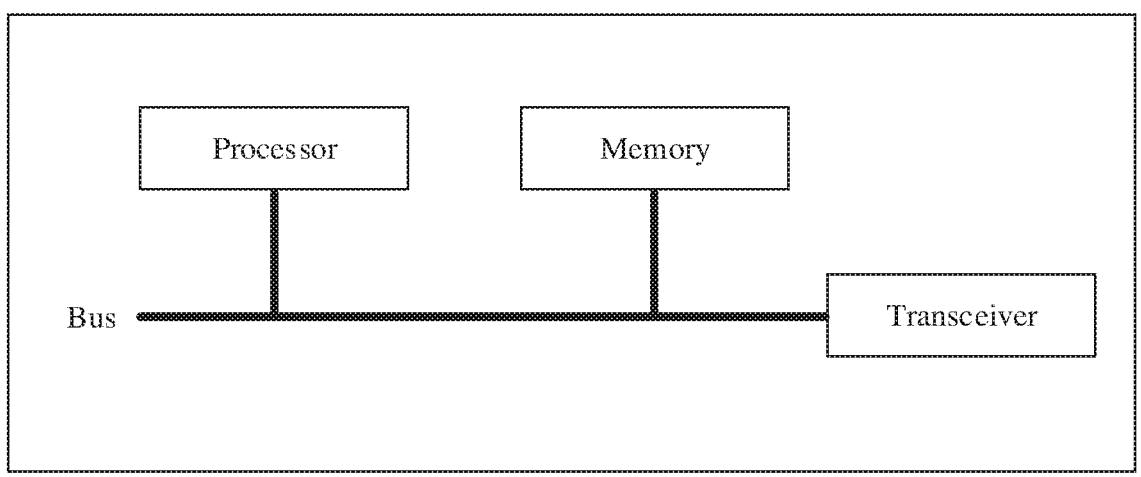
FIG. 7 is another schematic structural diagram of a service management apparatus according to an embodiment of this application.

FIG. 7 is another schematic structural diagram of an access authentication apparatus, an access apparatus, or a terminal device according to an embodiment of this application. The apparatus may include at least one processor, at least one network interface or another communications interface, a memory, at least one communications bus, and at least one transceiver that are configured to implement connection and communication between these apparatuses. The processor is configured to execute an executable module stored in the memory, for example, a computer program. The memory may include a high-speed random access memory (RAM), or may further include a non-volatile memory, for example, at least one magnetic disk memory. A communication connection between a system gateway and at least one other network element is implemented using the at least one network interface (which may be a wired or wireless), and the Internet, a wide area network, a local area network, a metropolitan area network, or the like may be used.

As shown in FIG. 7, in some implementations, the memory stores a program instruction, and the program instruction may be executed by the processor. The program instruction stored in the memory is invoked, such that the processor executes program code that needs to be invoked when the service management method in the embodiments of this application is performed.

It should be noted that in the embodiments corresponding to FIG. 6 of this application, a physical device corresponding to the transceiver module may be a transceiver, and a physical device corresponding to the processing module may be a processor. Each apparatus shown in FIG. 6 may have a structure shown in FIG. 7. When one of the apparatuses has the structure shown in FIG. 7, the processor and the transceiver in FIG. 7 implement functions same as or similar to those of the processing module and the transceiver module that are provided in the foregoing apparatus embodiment corresponding to the apparatus, and the memory in FIG. 7 stores program code that needs to be invoked when the processor performs the service management method.

In the foregoing embodiments, descriptions of the embodiments have different emphases. For parts that are not described in detail in one embodiment, refer to related descriptions of other embodiments.

It may be clearly understood by a person skilled in the art that, for the purpose of convenient and brief description, for a detailed working process of the described system, apparatus, and module, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module division is merely logical function division and may have another division manner in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electric, mechanical, or other forms.

The modules described as separate parts may or may not be physically separate, and parts displayed as modules may or may not be physical modules, may be located in one position, or may be distributed on a plurality of network modules. Some or all of the modules may be selected based on an actual requirement to achieve the objectives of the solutions of the embodiments.

In addition, functional modules in the embodiments of this application may be integrated into one processing module, or each of the modules may exist alone physically, or two or more modules are integrated into one module. The integrated module may be implemented in a form of hardware, or may be implemented in a form of a software functional module. When the integrated module is implemented in the form of a software functional module and sold or used as an independent product, the integrated module may be stored in a computer-readable storage medium.

All or some of the embodiments may be implemented by software, hardware, firmware, or any combination thereof. When the embodiments are implemented using software, all or some of the embodiments may be implemented in a form of a computer program product.

The computer program product includes one or more computer instructions. When the computer program instructions are loaded and executed on the computer, all or some of the procedure or functions according to the embodiments of this application are generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, including one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

The technical solutions provided in this application are described in detail above. The principle and the implementations of this application are described in this application through examples. The description about the embodiments is merely provided to help understand the method and core ideas of this application. In addition, a person of ordinary skill in the art can make variations to the implementations and application scopes according to the idea of this application. Therefore, the content of this specification shall not be construed as a limit to this application.

What is claimed is:

1. A service management method, comprising:
receiving, by a second network management unit, a network management request from a service management unit, wherein the network management request carries network requirement information;
determining, by the second network management unit, a target network type based on the network requirement information and a preset policy, wherein determining the target network type comprises determining whether a target network is a sliced network or a non-sliced network, wherein the preset policy comprises an association relationship between a network type and the network requirement information, wherein the network requirement information comprises an isolation requirement of the target network, wherein a type of the target network is the target network type, and wherein the association relationship between the network type and the network requirement information comprises an association relationship between the isolation requirement of a network and the network type; and deploying, by the second network management unit, the target network based on whether the target network is the sliced network or the non-sliced network.

2. The service management method according to claim 1, further comprising:

determining, by the second network management unit, the target network type based on network type indication information or the network requirement information; and sending, by the second network management unit, a network request to a target network management unit in at least one first network management unit after the second network management unit determines, based on the network type indication information or the network requirement information, that the target network type is the sliced network, and wherein the second network management unit is configured to perform service access management on both the sliced network and the non-sliced network.

3. The service management method according to claim 2, wherein before sending, by the second network management unit, the network request after the second network management unit determines that the target network type is the sliced network, the service management method further comprises determining, by the second network management unit, the target network management unit in the at least one first network management unit.

4. The service management method according to claim 2, wherein the network request carries the network requirement information.

5. The service management method according to claim 1, further comprising sending, by the second network management unit, a network capability request to at least one first network management unit.

6. The service management method according to claim 5, wherein the network capability request is for obtaining current network capability information of the at least one first network management unit.

7. The service management method according to claim 1, further comprising sending, by the second network management unit, a network request to a target network management unit after the second network management unit determines, based on the network requirement information and the preset policy, that the target network is the non-sliced network.

8. The service management method according to claim 7, wherein the network request instructs the target network management unit to allocate resources to the non-sliced network to meet a requirement specified by the network requirement information.

9. A service management apparatus, comprising:
at least one processor; and
a non-transitory computer-readable storage medium coupled to the at least one processor and storing programming instructions for execution by the at least one processor such that when executed, cause the at least one processor to:

receive a network management request from a service management unit, wherein the network management request carries network requirement information;

determine a target network type of a target network based on the network requirement information and a preset policy, wherein the target network type comprises a sliced network or a non-sliced network, and wherein the preset policy comprises an association relationship between a network type and the network requirement information, wherein the network requirement information comprises an isolation requirement of the target network, wherein a type of the target network is the target network type, and wherein the association relationship comprises at least an association relationship between the isolation requirement of a network and the network type; and deploy the target network based on whether the target network is the sliced network or the non-sliced network.

10. The service management apparatus according to claim 9, wherein execution of the programming instructions further causes the at least one processor to send a network request to a target network management unit in at least one first network management unit after determining, based on network type indication information or the network requirement information, that the target network type is the sliced network, and wherein the network request carries the network requirement information.

11. The service management apparatus according to claim 10, wherein execution of the programming instructions further causes the at least one processor to determine the target network management unit in the at least one first network management unit.

12. The service management apparatus according to claim 9, wherein execution of the programming instructions further causes the at least one processor to send a network request to a target network management unit after the service management apparatus determines that the target network is the non-sliced network.

13. The service management apparatus according to claim 9, wherein execution of the programming instructions further causes the at least one processor to send a network capability request to at least one first network management unit, and wherein the network capability request is for obtaining current network capability information of the at least one first network management unit.

14. A service management system, comprising:
a service management unit configured to send a network management request, wherein the network management request carries network requirement information; and
a second network management unit configured to:
receive the network management request from the service management unit;
determine a target network type of a target network based on the network requirement information and a preset policy, wherein the target network type comprises a sliced network or a non-sliced network, wherein the preset policy comprises an association relationship between a network type and the network requirement information, wherein the network requirement information comprises an isolation requirement of the target network, wherein a type of the target network is the target network type, and wherein the association relationship comprises at least an association relationship between the isolation requirement of a network and the network type; and deploy the target network based on whether the target network is the sliced network or the non-sliced network.

15. The service management system according to claim 14, wherein the second network management unit is further configured to send a network request to a target network management unit after the second network management unit determines, based on the network requirement information and the preset policy, that the target network is the non-sliced network.

16. The service management system according to claim 14, wherein the service management unit includes a communication service management function (CSMF).

* * * * *

UNITED STATES PATENT AND TRADEMARK OFFICE
CERTIFICATE OF CORRECTION

PATENT NO. : 11,356,328 B2
APPLICATION NO. : 16/787631
DATED : June 7, 2022
INVENTOR(S) : Jia et al.

Page 1 of 1

It is certified that error appears in the above-identified patent and that said Letters Patent is hereby corrected as shown below:

On the Title Page

Page 2, Column 1, Line 17, Item (56) References Cited, U.S. Patent Documents: "2018/0123961 A1 5/2018 Farman" should read "2018/0123961 A1 5/2018 Farmanbar"

Signed and Sealed this
Twenty-sixth Day of July, 2022

Katherine Kelly Vidal
*Director of the United States Patent and Trademark Office*